US012756052B2

(12) United States Patent
Ochi

(10) Patent No.: US 12,756,052 B2
(45) Date of Patent: Oct. 6, 2026

(54) ELECTRONIC DEVICE AND BATTERY HOLDER

(71) Applicant: EAGLE INDUSTRY CO., LTD., Tokyo (JP)

(72) Inventor: Satoshi Ochi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 717 days.

(21) Appl. No.: 18/018,501

(22) PCT Filed: Aug. 6, 2021

(86) PCT No.: PCT/JP2021/029352
§ 371 (c)(1),
(2) Date: Jan. 27, 2023

(87) PCT Pub. No.: WO2022/030624
PCT Pub. Date: Feb. 10, 2022

(65) Prior Publication Data

US 2023/0291058 A1 Sep. 14, 2023

(30) Foreign Application Priority Data

Aug. 7, 2020 (JP) ................................ 2020-134654

(51) Int. Cl.
*H01M 50/267* (2021.01)
*H01M 50/289* (2021.01)
*H01M 50/531* (2021.01)

(52) U.S. Cl.
CPC ....... *H01M 50/267* (2021.01); *H01M 50/289* (2021.01); *H01M 50/531* (2021.01)

(58) Field of Classification Search
CPC .. H01M 50/40; H01M 50/267; H01M 50/531; H01M 50/289
See application file for complete search history.

(56) References Cited

U.S. PATENT DOCUMENTS 4,206,274 A 6/1980 Peels ........................ H01M 2/10
4,828,944 A * 5/1989 Yabe .................... H01M 50/216 220/348

(Continued)

FOREIGN PATENT DOCUMENTS

CN 203762298 U 8/2014
JP 49006417 1/1974 ............. H01M 2/10

(Continued)

OTHER PUBLICATIONS

International Search Report, Written Opinion and International Preliminary Report on Patentability issued in related PCT International Patent Application Serial No. PCT/JP2021/029353, dated Oct. 19, 2021, 20 pages.

(Continued)

*Primary Examiner* — Kenneth J Douyette
(74) *Attorney, Agent, or Firm* — HAYES SOLOWAY P.C.

(57) ABSTRACT

An electronic device includes a detachable battery holder holding a battery. A positive terminal and a negative terminal of the electronic device are arranged side by side. The battery holder constitutes a battery unit together with the battery and a spacer defining the position of the battery. A positive terminal and a negative terminal of the battery unit are arranged side by side on one end side. The battery holder has an upright wall portion formed at one end of the battery holder and configured to come into contact with and support the battery so as to expose the positive terminal and the negative terminal. At least one pair of the positive terminal and the negative terminal, and the positive terminal and the negative terminal is formed to be contractible.

6 Claims, 19 Drawing Sheets

(56) References Cited

U.S. PATENT DOCUMENTS

| | | | | |
|---|---|---|---|---|
| 5,075,182 | A | 12/1991 | Weber | |
| 5,612,147 | A | 3/1997 | Nagata | |
| 5,626,979 | A | 5/1997 | Mitsui et al. | H01M 2/02 |
| 5,868,790 | A | 2/1999 | Vincent et al. | |
| 11,950,636 | B2 | 4/2024 | Qiu et al. | |
| 2004/0016455 | A1* | 1/2004 | Oogami | H01M 50/291 136/251 |
| 2006/0134513 | A1 | 6/2006 | Tsumura et al. | |
| 2008/0253066 | A1 | 10/2008 | Tracy et al. | |
| 2013/0136971 | A1 | 5/2013 | Igarashi | |
| 2014/0162114 | A1 | 6/2014 | Suzuki | |
| 2014/0363716 | A1* | 12/2014 | Nishida | H01M 50/244 429/96 |
| 2017/0084891 | A1 | 3/2017 | Lu et al. | |
| 2019/0261690 | A1 | 8/2019 | Lin et al. | |
| 2020/0038285 | A1* | 2/2020 | Bauer | H02J 7/00302 |
| 2021/0083348 | A1 | 3/2021 | Akasawa | |

FOREIGN PATENT DOCUMENTS

| | | | | |
|---|---|---|---|---|
| JP | 54091729 | | 7/1979 | H01M 2/10 |
| JP | 57004163 | | 1/1982 | H01M 2/10 |
| JP | 2148558 | | 11/1992 | H01M 2/10 |
| JP | 4123065 | | 11/1992 | H01M 2/10 |
| JP | 7335186 | | 12/1995 | H01M 2/10 |
| JP | H8045490 | | 2/1996 | H01M 2/10 |
| JP | 200176695 | | 3/2001 | H01M 2/10 |
| JP | 2001305623 | | 11/2001 | G03B 17/02 |
| JP | 2013-242967 | A2 | 12/2013 | |
| JP | 201996489 | | 6/2019 | F21L 4/00 |
| JP | 2019153485 | | 9/2019 | H01M 2/10 |
| JP | 2019537431 | | 12/2019 | A01C 11/00 |
| WO | WO2019198279 | | 10/2019 | |

OTHER PUBLICATIONS

International Search Report, Written Opinion and International Preliminary Report on Patentability issued in related PCT International Patent Application Serial No. PCT/JP2021/029352, dated Oct. 19, 2021, 20 pages.

Extended European Search Report issued in EP Patent Appln. Serial No. 21854304.9, dated Nov. 15, 2024, 8 pages.

* cited by examiner

ELECTRONIC DEVICE AND BATTERY HOLDER

TECHNICAL FIELD

The present invention relates to a battery-powered electronic device and a battery holder applied to the battery-powered electronic device.

BACKGROUND ART

A battery-powered electronic device requires no connection to an external power source, so that it can be used anywhere.

For example, a sensor device described in Patent Citation 1 is an electronic device that senses the state of a manufacturing device installed on a manufacturing line, and includes a button cell as a power source. Further, a battery holder holding the button cell can extend through a slit-shaped insertion portion of a housing to supply the sensor device with power. The battery holder is configured such that a first terminal and a second terminal in contact with a positive electrode and a negative electrode of the button cell, respectively, a processing circuit processing the output of a sensor element, a communication circuit communicating with the outside, and a connector configured to be electrically connected to the sensor element, or the like are mounted on a support substrate. The battery holder holds the button cell and extends through the insertion portion of the housing to electrically connect a terminal of the sensor element fixed in the housing with a connector of the battery holder.

CITATION LIST

Patent Literature

Patent Citation 1: JP 2019-153485 A (Pages 8 and 9, FIG. 6)

SUMMARY OF INVENTION

Technical Problem

In the sensor device of Patent Citation 1, the battery holder holds the button cell and extends through the insertion portion of the housing to supply the sensor element with power. Accordingly, no power switch can be required to be provided separately to reduce the number of contact points. Meanwhile, the sensor device of Patent Citation 1 includes the second terminal provided on the battery holder, the second terminal being configured as a pair of elastic arms that forms a shape along the outer periphery of the button cell. That is, the second terminal provided on the battery holder has such a shape as to hold the button cell in a radial direction. Unfortunately, no battery having a shape other than the button cell can be used.

The present invention has been made in view of such problems, and an object of the present invention is to provide an electronic device and a battery holder that can be applied to different shaped batteries.

Solution to Problem

In order to solve the problem described above, an electronic device according to the present invention includes a positive terminal, a negative terminal and a detachable battery holder that holds a battery, wherein the positive terminal and the negative terminal are arranged side by side, the battery holder constitutes a battery unit together with the battery and a spacer defining a position of the battery, the battery unit includes a positive terminal and a negative terminal arranged side by side on one end side of the battery unit, the battery holder has an upright wall portion formed at one end of the battery holder and configured to come into contact with and support the battery so as to expose the positive terminal and the negative terminal of the battery unit, and at least one pair of the positive terminal and the negative terminal of the electronic device and the positive terminal and the negative terminal of the battery unit is formed to be contractible. According to the aforesaid feature of the present invention, the spacer can be used according to the shape of the battery used in the battery unit to hold the different shaped batteries and the spacer with the battery holder. Further, the upright wall portion on one end side of the battery holder is in contact with the electronic device, so that the positive terminal and the negative terminal arranged side by side on the one end side of the battery unit can be elastically pressed against the positive terminal and the negative terminal of the electronic device. Accordingly, the different shaped batteries can be used to supply power reliably.

It may be preferable that the wall portion is located between the positive terminal and the negative terminal of the electronic device or between the positive terminal and the negative terminal of the battery unit. According to this preferable configuration, the battery unit can be supported in a well-balanced manner, and the positive terminal and the negative terminal are unlikely to be short-circuited.

It may be preferable that the battery holder includes claws holding the battery and the spacer. According to this preferable configuration, the battery and the spacer can be held by the claws to hold the battery and the spacer more securely with the battery holder. Accordingly, the contact between the positive terminal and the negative terminal of the battery unit and the positive terminal and the negative terminal of the electronic device can be made reliably.

It may be preferable that the spacer is provided for each of the different shaped batteries. According to this preferable configuration, the spacer is used according to the shape of the different shaped batteries, so that the positive terminal and the negative terminal of the battery unit arranged side by side can be in contact with the positive terminal and the negative terminal of the electronic device.

It may be preferable that a positive electrode and a negative electrode of the battery are the positive terminal and the negative terminal of the battery unit, and the spacer is brought into contact with the battery holder and one end of the battery. According to this preferable configuration, the positive electrode and the negative electrode of the battery can be used as the positive terminal and the negative terminal of the battery unit to simplify the configuration of the spacer.

It may be preferable that the battery is a button cell, the spacer includes a base member, and the base member is provided with retainers configured for holding the button cell, and the positive terminal and the negative terminal of the battery unit that are electrically connected to the button cell. According to this preferable configuration, the positive terminal and the negative terminal of the base member as the positive terminal and the negative terminal of the battery unit can be arranged side by side on one end side of the battery unit. Further, the battery unit holding the button cells are in contact with and supported by the wall portion at one end of the battery holder, so that the positive terminal and the negative terminal of the battery unit can be arranged at predetermined positions.

A battery holder according to the present invention holds a battery applied to an electronic device including a positive terminal and a negative terminal arranged side by side, wherein the battery holder constitutes a battery unit together with the battery and a spacer defining a position of the battery, the battery unit includes a positive terminal and a negative terminal arranged side by side on one end side of the battery unit, the battery holder has an upright wall portion formed at one end of the battery holder and configured to come into contact with and support the battery so as to expose the positive terminal and the negative terminal of the battery unit, and at least one pair of the positive terminal and the negative terminal of the electronic device and the positive terminal and the negative terminal of the battery unit is formed to be contractible. According to the feature of the present invention, the spacer can be used according to the shape of the battery applied to the battery unit to hold the different shaped batteries and the spacer with the battery holder. Further, the upright wall portion on one end side of the battery holder is in contact with the electronic device, so that the positive terminal and the negative terminal arranged side by side on the one end side of the battery unit can be elastically pressed against the positive terminal and the negative terminal of the electronic device. Accordingly, the different shaped batteries can be used to supply power reliably.

BRIEF DESCRIPTION OF DRAWINGS

FIG. 4 illustrates a state in which an outer case is removed.

FIG. 5 illustrates a state in which the outer case is removed.

In FIG. 16, only the battery holder is illustrated in cross section.

In FIG. 17, only the battery holder is illustrated in cross section.

In FIG. 18, only the battery holder is illustrated in cross section.

DESCRIPTION OF EMBODIMENTS

Figure 1:
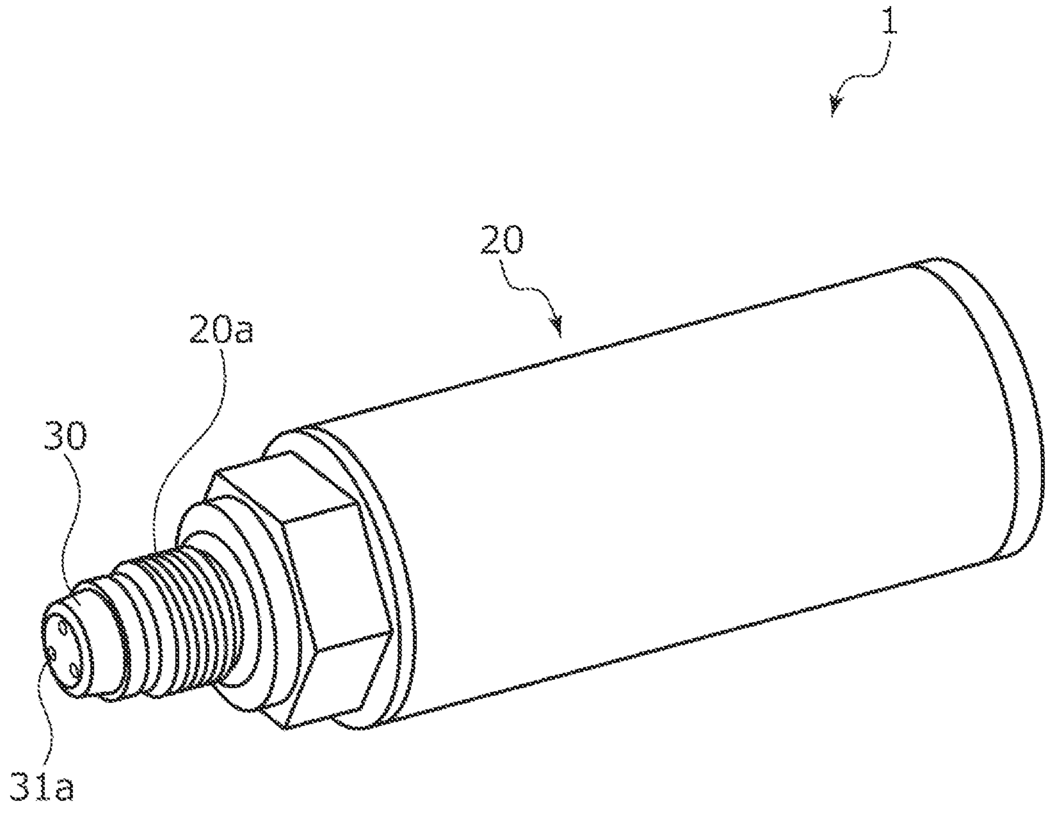
FIG. 1 is a perspective view illustrating a pressure sensor as an electronic device according to a first embodiment of the present invention.

Modes for carrying out an electronic device according to the present invention will be described below based on embodiments.

First Embodiment

An electronic device as an electronic device according to a first embodiment of the present invention will be described with reference to FIGS. 1 to 7. Hereinafter, the left and right sides when viewed from the front side of FIG. 3 will be described as the left and right sides of the electronic device. Specifically, the left side of the drawing on which a sensor unit 30 is provided will be described as the left side of the electronic device, and the right side of the drawing on which a cap member 23 is attached will be described as the right side of the electronic device.

As illustrated in FIG. 1, the electronic device according to the first embodiment of the present invention is a pressure sensor 1 configured to detect the pressure of an object to be measured and including a battery 10 (see FIG. 2) as a power source. The pressure sensor 1 is fixed to an installed portion such as a pipe, a duct, or a tank (not illustrated), and detects the pressure of the object to be measured inside the installed portion. The object to be measured is a fluid such as a liquid or a gas.

Figure 2:
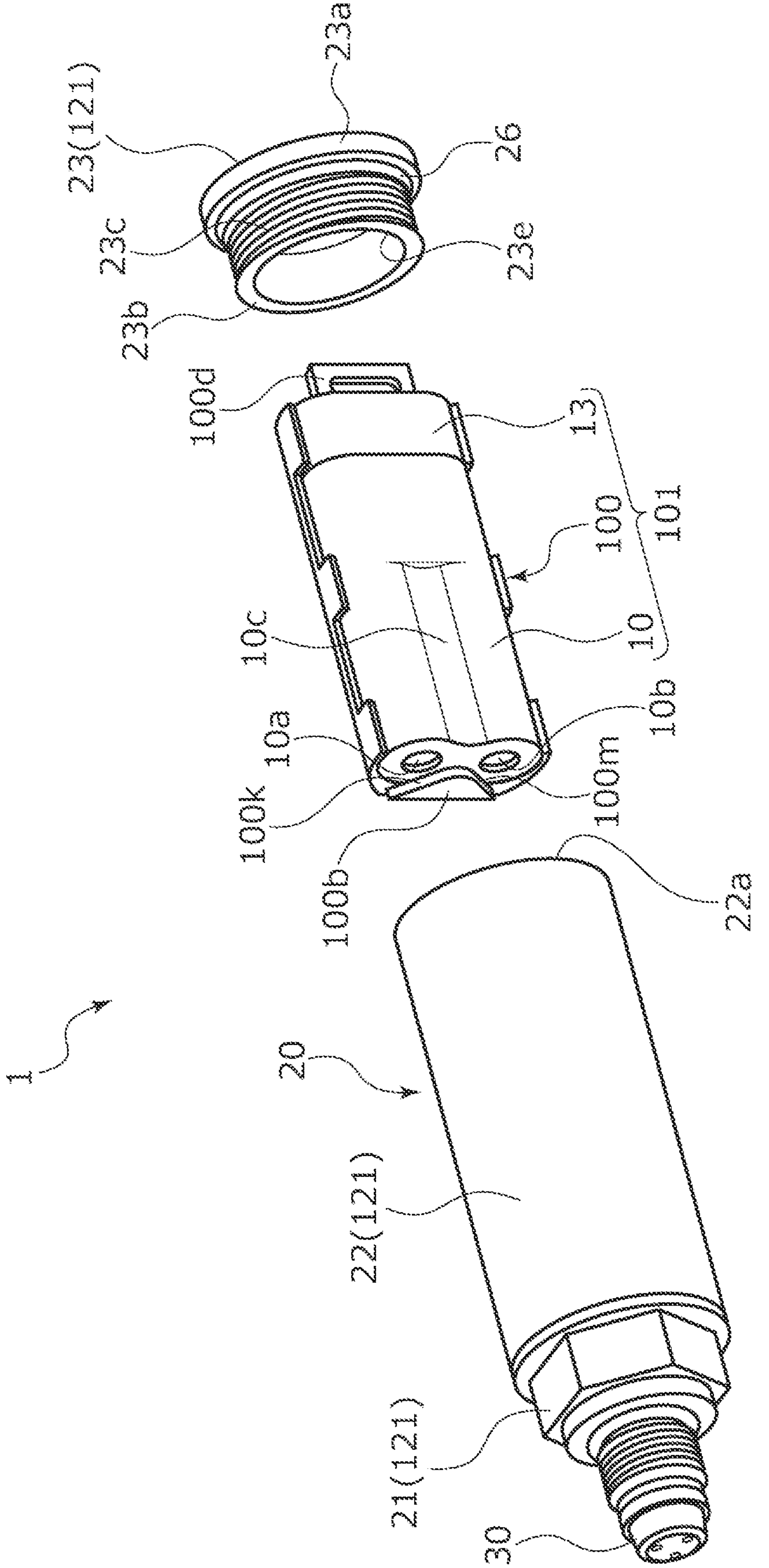
FIG. 2 is an exploded perspective view illustrating the structure of the pressure sensor in the first embodiment.
Figure 3:
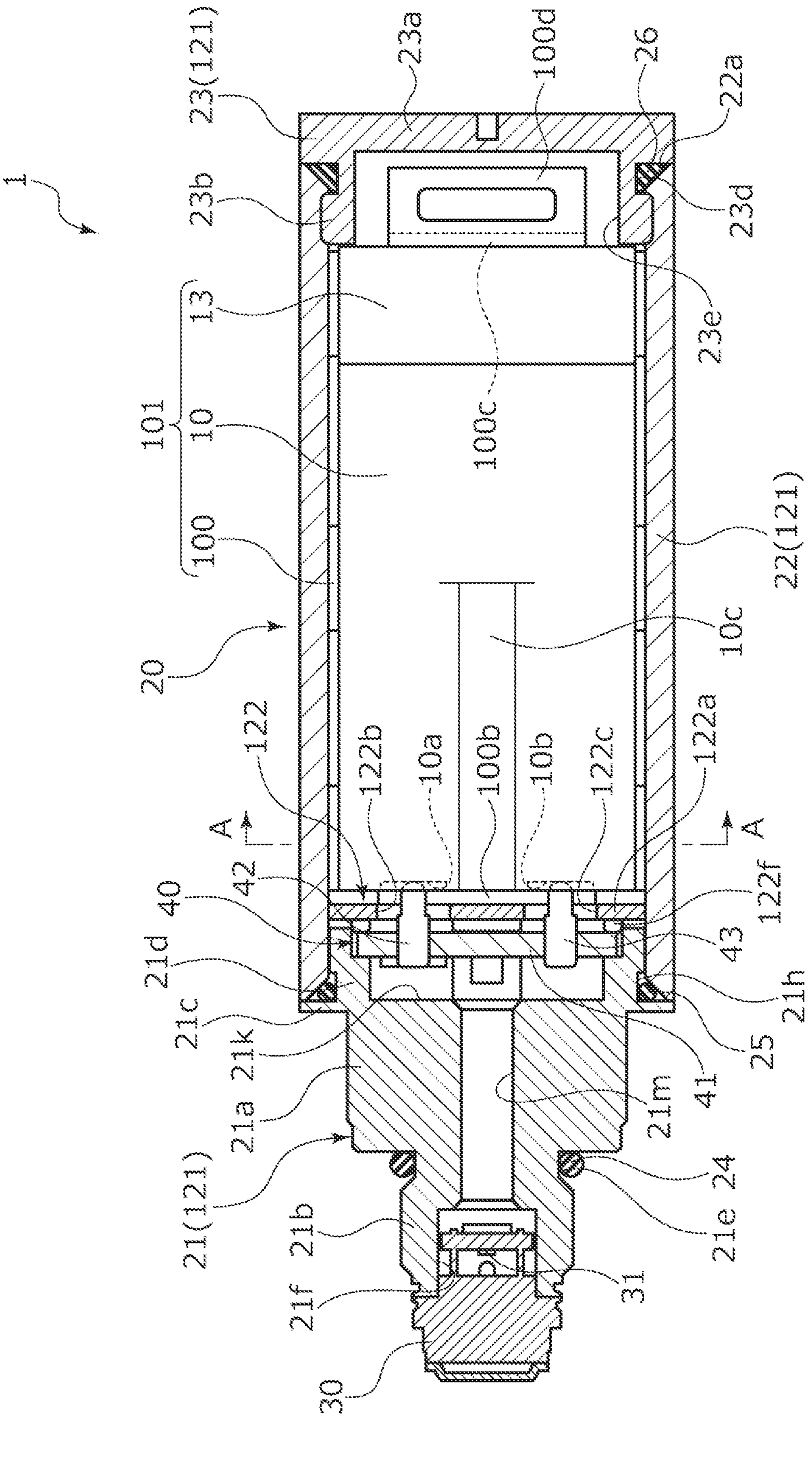
FIG. 3 is a cross-sectional view illustrating the structure of the pressure sensor in the first embodiment.

As illustrated in FIG. 1, the pressure sensor 1 mainly includes a housing 20, the sensor unit 30, a battery holder 100 (see FIG. 2), and a circuit unit 40 (see FIG. 3). The sensor unit 30 is attached to the left end portion of the housing 20. The battery holder 100 is placed in the housing 20 and holds the battery 10.

For example, a screw portion 20*a* of the housing 20 is screwed into a mounting port of a pipe (not illustrated) to fix and use the pressure sensor 1. The screw portion 20*a* is formed at the left end portion of the outer periphery of the housing 20. Accordingly, a sensor element (not illustrated)

provided in the sensor unit 30 outputs a voltage corresponding to the pressure applied from the object to be measured, the fluid, inside the pipe. A processing chip 31 (see FIG. 3) converts this voltage into a pressure signal.

Figure 4:
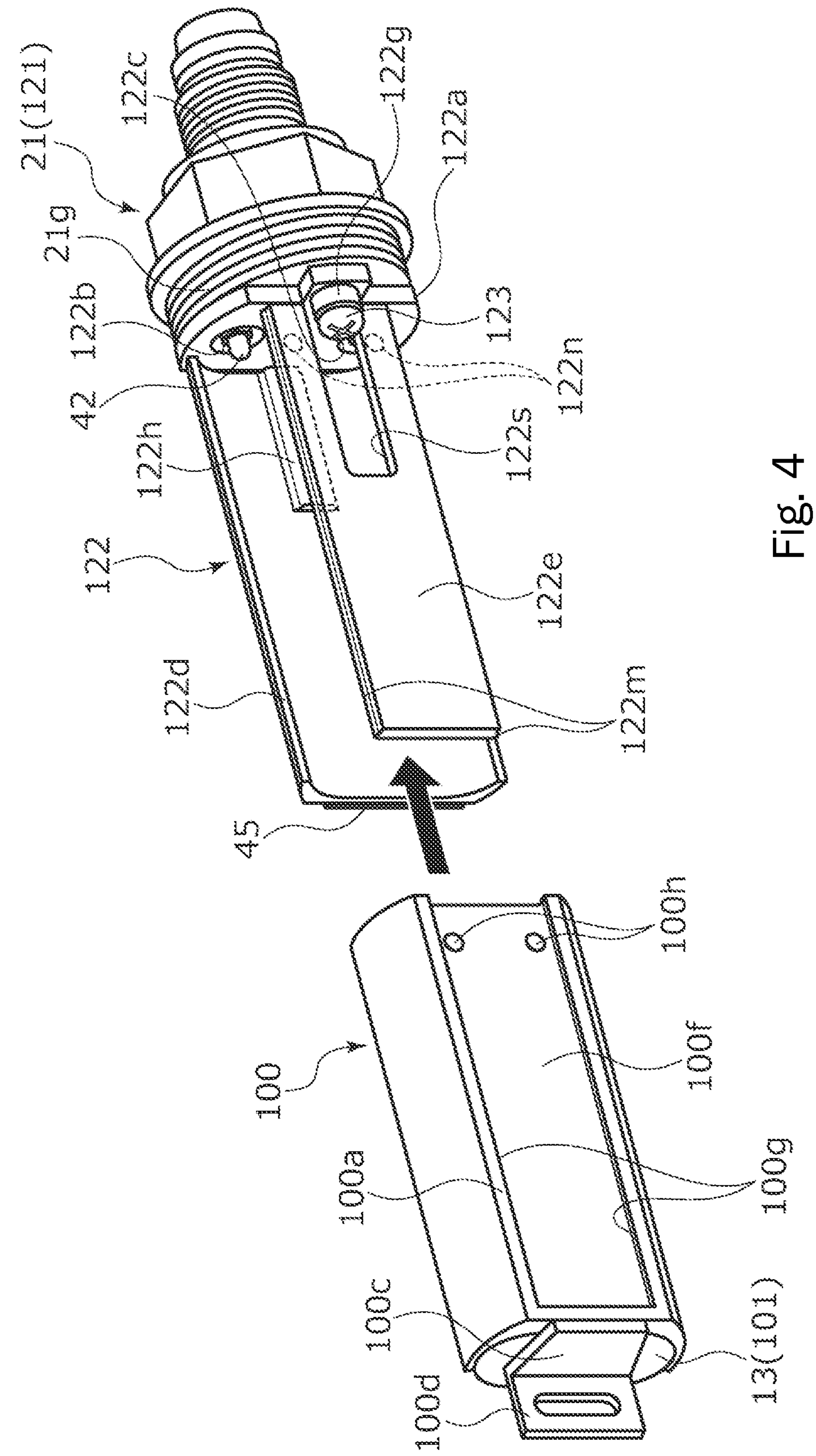
FIG. 4 is a perspective view illustrating the structure of an inner case and a battery holder in the first embodiment. For convenience of explanation.
Figure 5:
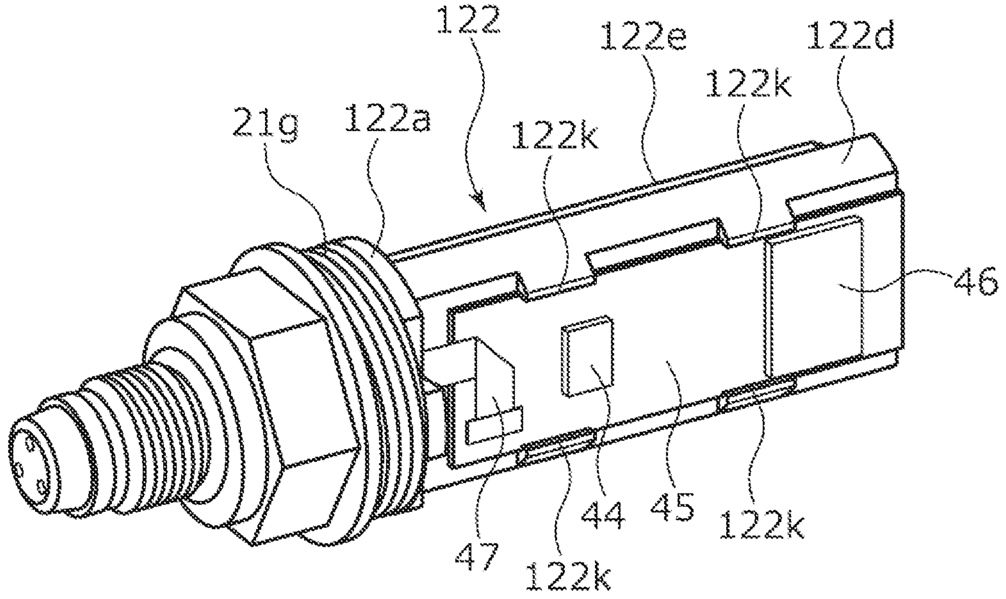
FIG. 5 is a perspective view illustrating the structure of the inner case in the first embodiment. For convenience of explanation.

As illustrated in FIGS. 2 and 3, the housing 20 includes a mounting member 21, an outer case 121, and an inner case 122 (see FIGS. 4 and 5). The screw portion 20*a* (see FIG. 1) is formed at the left end portion of the mounting member 21. The outer case 121 includes a cover member 22 attached to the right end portion of the mounting member 21 and the cap member 23 closing an opening 22*a* on the right side of the cover member 22. The inner case 122 is fixed to the mounting member 21 and is covered with the cover member 22 and the cap member 23, namely, the outer case 121.

As illustrated in FIG. 3, the mounting member 21 includes a tubular base portion 21*a*, a small diameter portion 21*b* extending to the left from the base portion 21*a*, a flange portion 21*c* projecting radially outward from the right end portion of the outer periphery of the base portion 21*a*, and a large diameter portion 21*d* extending to the right from the base portion 21*a*.

The small diameter portion 21*b* has the screw portion 20*a* (see FIG. 1) described above formed on the outer periphery. An annular recess 21*e* is formed at the right end portion of the outer periphery of the small diameter portion 21*b*, and an O-ring 24 is mounted on the recess 21*e*. The screw portion 20*a* formed on the outer periphery of the small diameter portion 21*b* is screwed into the mounting port of the pipe (not illustrated) to compress the O-ring 24 between the pipe and the mounting member 21 to ensure the sealing performance.

Further, a recess 21*f* is formed at the left end portion of the small diameter portion 21*b*, the recess 21*f* being recessed to the right, and the sensor unit 30 is inserted into the recess 21*f* from the left to be fixed by welding. Although details are omitted, the sealing performance is ensured so that the object to be measured, the fluid, would not enter the side of a through hole 21*m* on which the processing chip 31 is arranged.

The large diameter portion 21*d* has a screw portion 21*g* (see FIGS. 4 and 5) formed on the outer periphery. An annular recess 21*h* is formed at the left end portion of the outer periphery of the large diameter portion 21*d*, and an O-ring 25 is mounted on the recess 21*h*. A screw portion (not illustrated) formed on the inner periphery of the left end portion of the cover member 22 is screwed into the screw portion 21*g* formed on the outer periphery of the large diameter portion 21*d* to compress the O-ring 25 between the mounting member 21 and the cover member 22 to ensure the sealing performance.

Further, a stepped recess 21*k* is formed at the right end portion of the large diameter portion 21*d*, the stepped recess 21*k* being recessed to the left, and a part of the circuit unit 40 is housed in the recess 21*k*. The recess 21*f* formed in the small diameter portion 21*b* and the recess 21*k* formed in the large diameter portion 21*d* are communicated with each other through the through hole 21*m* extending through the base portion 21*a* in the left-right direction. Further, the sensor unit 30 and the circuit unit 40 are electrically connected to each other by a flexible printed wiring board (not illustrated) extending in the through hole 21*m*.

Here, the circuit unit 40 will be described. As illustrated in FIG. 3, the circuit unit 40 mainly includes a disk-shaped circuit board 41, a positive terminal 42 and a negative terminal 43, and a rectangular plate-shaped circuit board 45 (see FIG. 5) on which a processing chip 44 and a wireless chip 46 are mounted. The circuit board 41 is housed in the recess 21*k* of the large diameter portion 21*d* in the mounting member 21. The positive terminal 42 and the negative terminal 43 are arranged side by side to extend through the circuit board 41 in the thickness direction. The circuit board 45 is held on the outer surface of a first plate portion 122*d* of the inner case 122, which will be described later. The processing chip 44 adjusts the electric power supplied from the battery 10, processes the signal input from the sensor unit 30, and the like. The wireless chip 46 is provided on the circuit board 45 to establish communication with the outside. The circuit board 41 and the circuit board 45 are electrically connected to each other by a flexible flat cable 47. Further, the positive terminal 42 and the negative terminal 43 may not extend through the circuit board 41 in the thickness direction.

As illustrated in FIGS. 3 and 4, the positive terminal 42 and the negative terminal 43 are so-called probe pins, and each include urging means (not illustrated), and the electric contacts of the positive terminal 42 and the negative terminal 43 are contractible in an axial direction and are urged in the extending direction. Specifically, the positive terminal 42 and the negative terminal 43 extend through two through holes 122*b*, 122*c* that are formed side by side to extend through a base portion 122*a* of the inner case 122 in the thickness direction, and are supported to be elastically retractable to the left with respective electrical contacts projecting from the through holes 122*b*, 122*c*. As illustrated in FIG. 3, the positive terminal 42 and the negative terminal 43 are slightly retracted to the left with the battery holder 100 attached. That is, the positive terminal 42 and the negative terminal 43 are elastically pressed against a positive electrode 10*a* and a negative electrode 10*b* of the battery 10 held by the battery holder 100, respectively.

Accordingly, since the positive electrode 10*a* and the negative electrode 10*b* of the battery 10 held by the battery holder 100 are in contact with the positive terminal 42 and the negative terminal 43, the circuit unit 40 can supply power to the sensor unit 30. Further, when the circuit unit 40 receives an input of a pressure signal from the sensor unit 30, the processing chip 44 can process the signal, and the wireless chip 46 can establish communication with the outside.

As illustrated in FIGS. 2 and 3, the cover member 22 constituting the outer case 121 forms a cylindrical shape, and the left end portion thereof is screwed into the screw portion 21*g* (see FIGS. 4 and 5) formed on the outer periphery of the large diameter portion 21*d* of the mounting member 21 to attach the cover member 22. Further, a screw portion 23*c* of the cap member 23 is screwed into the right end portion of the cover member 22 to close the opening 22*a*, the cap member 23 also constituting the outer case 121.

The cap member 23 includes a disk-shaped base portion 23*a* and a small diameter portion 23*b* projecting to the left from the left side surface of the base portion 23*a*. The screw portion 23*c* (see FIG. 2) is formed on the outer periphery of the small diameter portion 23*b*. Further, an annular recess 23*d* is formed at the right end portion of the outer periphery of the small diameter portion 23*b*, and an O-ring 26 is mounted on the recess 23*d*. The screw portion 23*c* of the cap member 23 is screwed into a screw portion (not illustrated) formed on the inner periphery of the right end portion of the cover member 22 to compress the O-ring 26 between the cover member 22 and the cap member 23 to ensure the sealing performance. Accordingly, the internal space of the outer case 121 is defined to be substantially sealed, in which the circuit unit 40 and the battery holder 100 are housed.

Further, a recess 23*e* is formed at the left end portion of the small diameter portion 23*b*, the recess 23*e* being recessed to the right, and a handle 100*d* is housed in the recess 23*e*, the handle 100*d* being formed at the right end portion of the battery holder 100.

As illustrated in FIGS. 3 to 6, the inner case 122 is made of a resin material and includes the base portion 122*a*, and the first plate portion 122*d* and a second plate portion 122*e* that extend from the base portion 122*a* in a direction in which the cap member 23 is arranged, namely, to the right (to the left in FIG. 4). The base portion 122*a* of the inner case 122 is fixed to the mounting member 21 by a screw 123 (see FIG. 4).

Through holes 122*b*, 122*c* are formed side by side in the base portion 122*a* as described above. Further, as illustrated in FIG. 3, a plurality of protrusions 122*f* is formed on the radially outer side of the left surface of the base portion 122*a* to project to the left. The radially outer portion of the circuit board 41 constituting the circuit unit 40 is held in the left-right direction between the tips of these protrusions 122*f* and the stepped portion formed in the recess 21*k* of the mounting member 21 when the inner case 122 is fixed to the mounting member 21. Accordingly, the circuit board 41 can be securely supported between the inner case 122 and the mounting member 21 (see FIG. 3).

Further, a boss 122*g* is provided on the right surface (the left surface in FIG. 4) of the base portion 122*a*, the boss 122*g* having a through hole through which the screw 123 extends.

Figure 6:
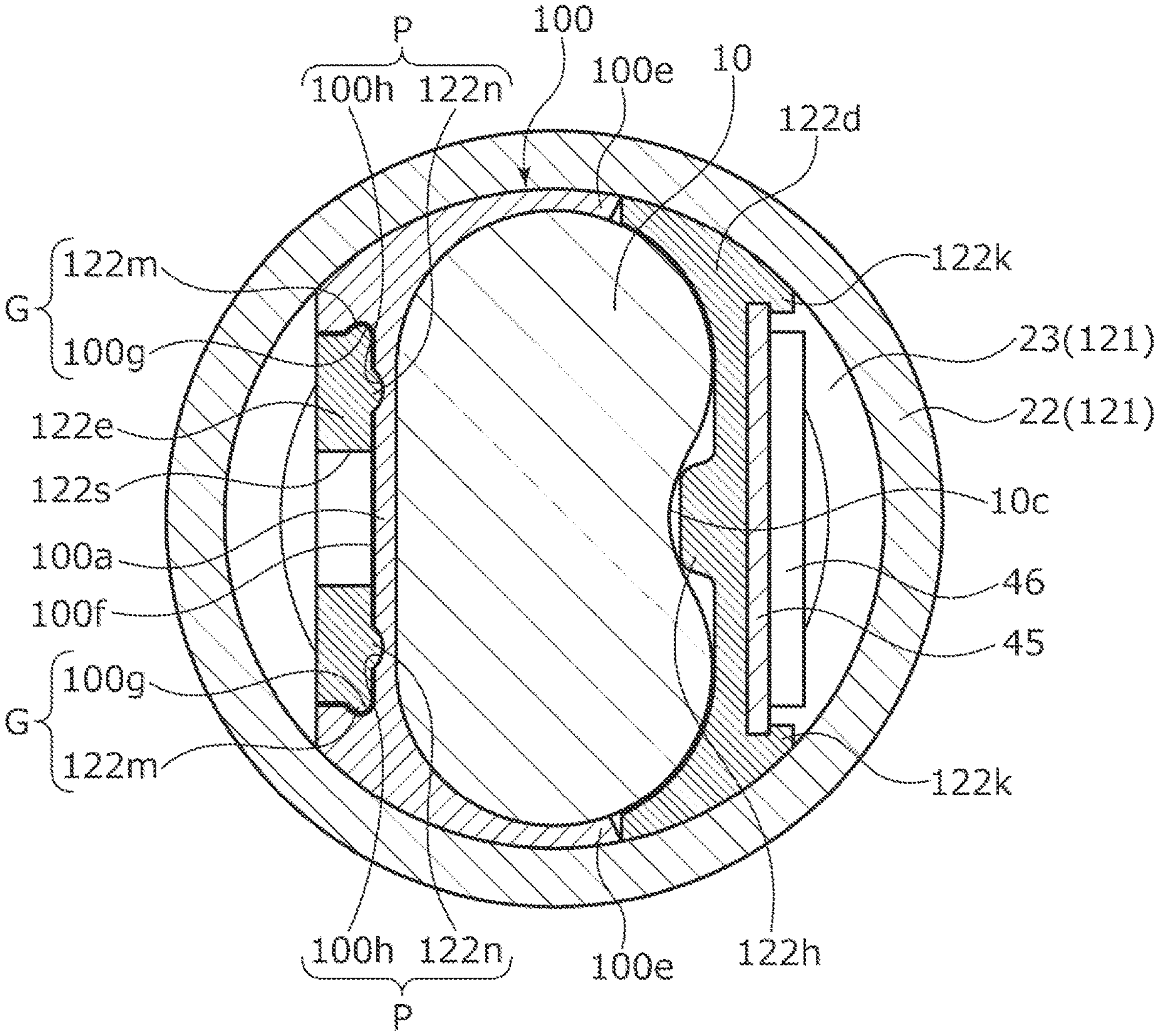
FIG. 6 is a cross-sectional view taken along the line A-A of FIG. 3.

As illustrated in FIGS. 4 and 6, the inner surface of the first plate portion 122*d* is curved along the surface shape of the battery 10 held by the battery holder 100. Further, a rectangular protrusion 122*h* is formed in the left end portion (the right end portion in FIG. 4) of the inner surface of the first plate portion 122*d*, and can be fitted into a recess 10*c* (see FIGS. 2 and 3) formed on the surface of the battery 10. Accordingly, a direction in which the battery holder 100 is inserted/removed into/from the inner case 122 can be restricted to prevent the reverse connection of the battery 10.

Further, as illustrated in FIGS. 5 and 6, the outer surface of the first plate portion 122*d* forms a flat surface at the substantially vertically central portions, and upper and lower paired hook-shaped projections 122*k* are provided at two locations in the left-right direction at the upper and lower end portions of the first plate portion 122*d*, respectively, and can hold the circuit board 45 constituting the circuit unit 40. The circuit board 45 is inserted between the upper and lower projections 122*k* from the right side of the first plate portion 122*d*. Further, the upper and lower side surfaces of the first plate portion 122*d* are curved along the inner periphery of the cover member 22 constituting the outer case 121.

As illustrated in FIGS. 4 and 6, the second plate portion 122*e* is formed to have a smaller dimension in the vertical direction, namely, in the lateral direction than the first plate portion 122*d*. Further, a pair of protruded portions 122*m* is formed on the inner surface side of the upper and lower end portions of the second plate portion 122*e* to extend in the left-right direction, namely, the longitudinal direction, which is the direction in which the battery holder 100 is inserted/removed. The protruded portions 122*m* each form a semi-circular shape in cross section.

Further, a pair of upper and lower hemispherical protrusions 122*n* is formed at the left end portion (right end portion in FIG. 4) on the inner surface of the second plate portion 122*e*.

Further, a substantially rectangular cutout 122*s* is formed at a substantially vertically central portion of the right end portion (the left end portion in FIG. 4) of the second plate portion 122*e*. The cutout 122*s* is formed in the second plate portion 122*e* to prevent a tool such as a driver from interfering with the second plate portion 122*e*. This facilitates the tightening of the screw 123 into the through hole of the boss 122*g* formed in the base portion 122*a*.

Next, the battery holder 100 will be described. In the first embodiment, an aspect of holding the spacer 13 made of the resin material and the pack lithium battery 10 (hereinafter, simply referred to as "battery 10") that includes the positive electrode 10*a* and the negative electrode 10*b* arranged side by side on one end side of the battery holder 100 in the longitudinal direction will be described. Further, in the first embodiment, the battery holder 100 holds the battery 10 and the spacer 13 to constitute the battery unit 101. Further, in the first embodiment, the positive terminal and the negative terminal of the battery unit 101 are the positive electrode 10*a* and the negative electrode 10*b* of the battery 10.

Figure 7:
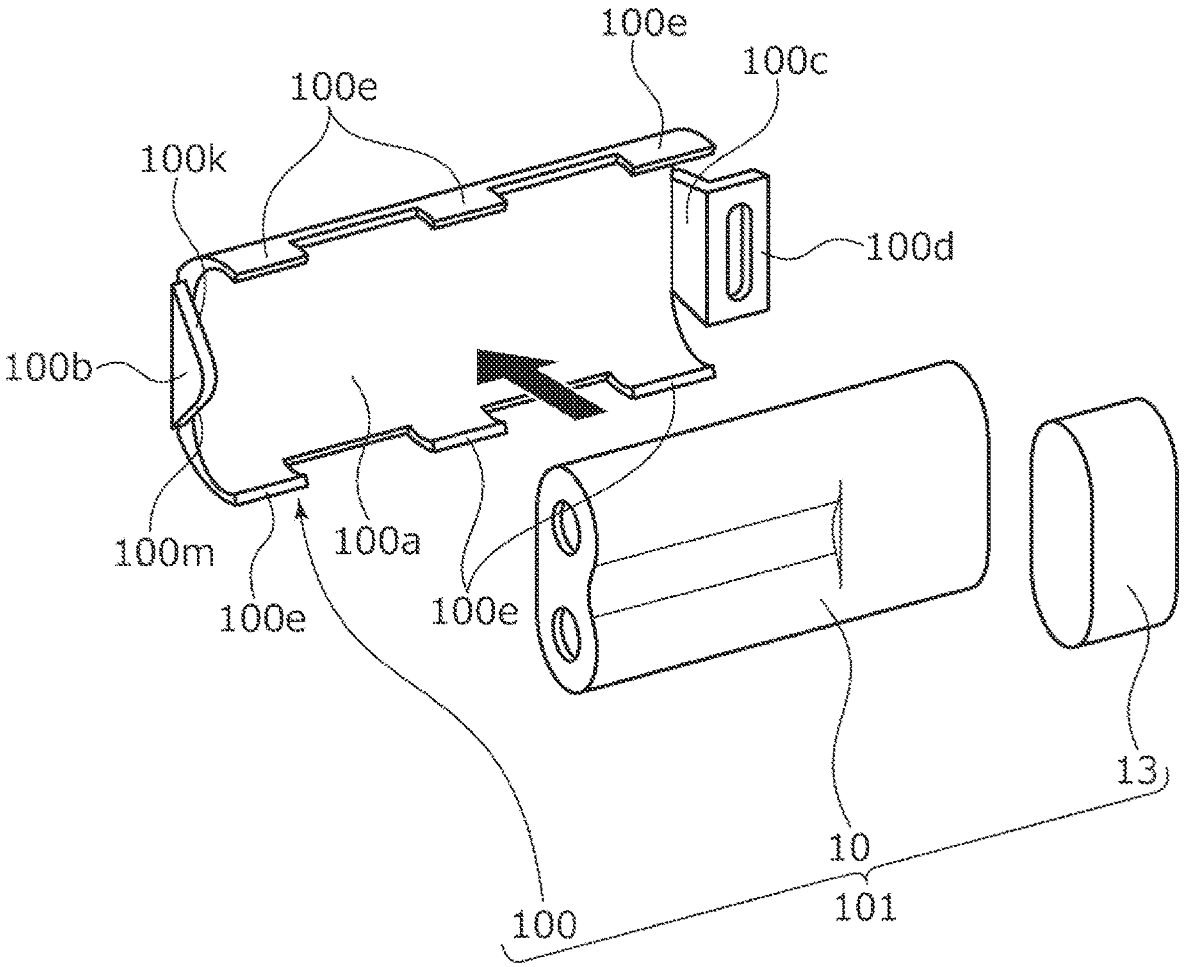
FIG. 7 is an exploded perspective view illustrating the structure of a battery unit in the first embodiment.

As illustrated in FIGS. 6 and 7, the battery holder 100 mainly includes a base portion 100*a*, wall portions 100*b*, 100*c*, and a handle 100*d*. The base portion 100*a* has an inner surface curved along the surface shape of the battery 10. The wall portion 100*b* is formed into a substantially triangular shape standing from the left end portion of the base portion 100*a* toward the inner surface side. The wall portion 100*c* is formed into a rectangular shape standing from the right end portion of the base portion 100*a* toward the inner surface side. The handle 100*d* bends and extends to the right from the wall portion 100*c*.

As illustrated in FIG. 2, the wall portion 100*b* forms a substantially triangular shape, and is in contact with one end of the battery 10 in the longitudinal direction with the battery 10 and the spacer 13 held by the battery holder 100. Accordingly, the positive electrode 10*a* and the negative electrode 10*b* of the battery 10 are exposed from cutout spaces 100*k*, 100*m* (see FIG. 7) of the battery holder 100. The wall portion 100*b* may be formed into any shape as long as the positive terminal 42 and the negative terminal 43 can extend through the wall portion 100*b* and the wall portion 100*b* can expose the positive electrode 10*a* and the negative electrode 10*b* of the battery 10 so that they can be in contact with the positive terminal 42 and the negative terminal 43, respectively, and instead of the cutout shape, a through hole may be formed in the wall portion.

Upper and lower paired claws 100*e* are provided at three locations in the left-right direction at the upper and lower end portions of the base portion 100*a*, respectively, and can hold the battery 10 and the spacer 13.

Further, as illustrated in FIG. 6, the base portion 100*a* has an outer surface forming a flat surface at substantially vertically central portion, and has an insertion recess 100*f*. The insertion recess 100*f* is open to the left side (the right side in FIG. 4) on which the wall portion 100*b* is formed, and the second plate portion 122*e* of the inner case 122 can be inserted from the right side (the left side in FIG. 4) into the insertion recess 100*f*. Paired recessed grooves 100*g* are formed on the inner surface side of the upper and lower inner walls of the insertion recess 100*f*, the grooves 100*g* extending in the left-right direction, namely, the longitudinal direction, that is the direction in which the battery holder 100 is inserted and removed, and facing each other in the vertical direction, namely, the lateral direction. The recessed grooves 100*g* each forms a semicircular shape in cross section, and constitute a pair of guide portions G that guides the movement of the battery holder 100 in the insertion/removal direction together with the pair of protruded portions 122*m* formed on the inner case 122 described above.

Further, a pair of upper and lower hemispherical recesses 100*h* is formed at the left end portion (the right end portion in FIG. 4) of the bottom surface of the insertion recess 100*f*. The pair of protrusions 122*n* formed on the inner case 122 described above can be fitted into the recesses 100*h* to constitute a positioning mechanism P for the battery holder 100 and to lock the battery holder 100 so that it would not move in the left-right direction accidentally. Further, the wall portion 100*b* of the battery holder 100 is in contact with the right surface of the base portion 122*a* of the inner case 122 with the protrusions 122*n* of the inner case 122 fitted into the recesses 100*h* (see FIG. 3).

As illustrated in FIGS. 2 and 3, the battery 10 includes a positive electrode 10*a* and a negative electrode 10*b* arranged side by side at the left end portion, that is, at one end portion in the longitudinal direction with the battery 10 and the spacer 13 held by the battery holder 100. Further, the spacer 13 is in contact with the right end portion of the battery 10, that is, the other end portion in the longitudinal direction and the wall portion 100*c* (see FIGS. 4 and 7) of the battery holder 100 to define the position of the battery 10. The distance between the wall portions 100*b*, 100*c* of the battery holder 100 in the left-right direction is configured to be the same as or slightly shorter than the sum of the dimension of the battery 10 in the left-right direction and the dimension of the spacer 13 in the left-right direction.

Accordingly, the spacer 13 can be used according to the shape of the battery 10 to hold the battery 10 and the spacer 13 with the battery 10 and the spacer 13 held by the wall portions 100*b*, 100*c* of the battery holder 100 in the longitudinal direction. Further, the longitudinal positions of the positive terminal and the negative terminal of the battery unit 101, that is, the positive electrode 10*a* and the negative electrode 10*b* of the battery 10 can be arranged at predetermined positions on one end side of the battery holder 100 in the longitudinal direction. Additionally, the upright wall portion 100*b* on one end side of the battery holder 100 in the longitudinal direction is in contact with the housing 20 of the pressure sensor 1, specifically, the base portion 122*a* of the inner case 122, so that the positive terminal and the negative terminal of the battery unit 101, that is, the positive electrode 10*a* and the negative electrode 10*b* of the battery 10 can be elastically pressed against the positive terminal 42 and the negative terminal 43 of the pressure sensor 1 to supply the power reliably.

Further, since the wall portion 100*b* is located near the positive electrode 10*a* and the negative electrode 10*b*, the battery holder 100 is easily attached/detached at the time of battery replacement or the like, and at the time of attachment/detachment or the like, other components are unlikely to be brought into contact with the positive electrode 10*a* and the negative electrode 10*b*. The positive terminal and the negative terminal of the battery unit 101 may be arranged vertically side by side, and the left and right positions thereof may not be the same.

Further, as illustrated in FIG. 7, the wall portions 100*b*, 100*c* of the battery holder 100 each have the upper and lower cutout spaces to be formed into one-sided shape that is a cantilever plate standing upright from the left or right end portion of the base portion 100*a*. This facilitates elastically holding the battery 10 and the spacer 13 with the wall portions 100*b*, 100*c* of the battery holder 100 in the longitudinal direction.

Further, since the wall portion 100*b* is located between the positive electrode 10*a* and the negative electrode 10*b*, it can support the battery unit 101 in a well-balanced manner. Additionally, the positive electrode 10*a* and the negative electrode 10*b* are unlikely to be short-circuited.

Further, since the positive electrode 10*a* and the negative electrode 10*b* do not project outward from the wall portion 100*b*, other components are unlikely to be brought into contact with the positive electrode 10*a* and the negative electrode 10*b* at the time of battery replacement.

Further, in the first embodiment, the positive electrode 10*a* and the negative electrode 10*b* of the battery 10 can be used as the positive terminal and the negative terminal of the battery unit 101 to simplify the configuration of the spacer 13.

Further, the battery holder 100 includes the wall portion 100*b* in contact with one end portion of the battery 10 in the longitudinal direction, and the wall portion 100*b* has the cutouts exposing the positive electrode 10*a* and the negative electrode 10*b* of the battery 10 as the positive terminal and the negative terminal of the battery unit 101. Accordingly, the positive electrode 10*a* and the negative electrode 10*b* of the battery 10 can be exposed from the cutouts provided in the wall portion 100*b* with the wall portion 100*b* being in contact with one end portion of the battery 10 in the longitudinal direction. That is, the longitudinal positions of the positive terminal and the negative terminal of the battery unit 101 are restricted to the predetermined positions. Accordingly, the contact with the positive terminal 42 and the negative terminal 43 of the pressure sensor 1 can be reliably made. Further, the battery unit 101 can be made compact in the longitudinal direction.

Further, the battery holder 100 includes the pair of upper and lower claws 100*e* holding the battery 10 and the spacer 13 from the lateral direction, that is, from a direction in which the positive terminal and the negative terminal of the battery unit 101 are arranged side by side. Accordingly, the battery 10 and the spacer 13 can be held by the battery holder 100 in the lateral direction as well as in the longitudinal direction to hold the battery unit 101 more securely. Accordingly, the contact with the positive terminal 42 and the negative terminal 43 of the pressure sensor 1 can be made more reliably.

Further, the battery holder 100 can be detachable with the pressure sensor 1 installed in the installed portion such as a pipe to easily replace the battery. Specifically, without removing the entire housing 20 from the installed portion such as pipe, only the cap member 23 is detached, and only the battery holder 100 holding the battery 10 and the spacer 13 is inserted and removed, so that the battery replacement can be easily made. Accordingly, the sensor unit 30 and the circuit unit 40 do not need to be touched and moved at the time of battery replacement, so that the pressure sensor 1 can stably sense the object to be measured. Additionally, the pressure sensor 1 does not need to be removed from the pipe or the like, so that the operation of the fluid system provided with the pipe would not need to be stopped at the time of battery replacement.

Further, since the battery holder 100 is provided with the handle 100*d*, the handle 100*d* is used to remove the battery holder 100, facilitating drawing the battery holder 100 from the pressure sensor 1.

The outer case 121 constituting the housing 20 may be configured to have a reverse screw so that the cover member 22 and the mounting member 21 would not rotate together when the cap member 23 is removed, or may be configured such that the fastening force between the cap member 23 and the cover member 22 is the weakest.

Second Embodiment

An electronic device according to a second embodiment of the present invention will be described with reference to FIG. 8. The redundant descriptions of the same configuration as in the first embodiment will be omitted.

Figure 8A:
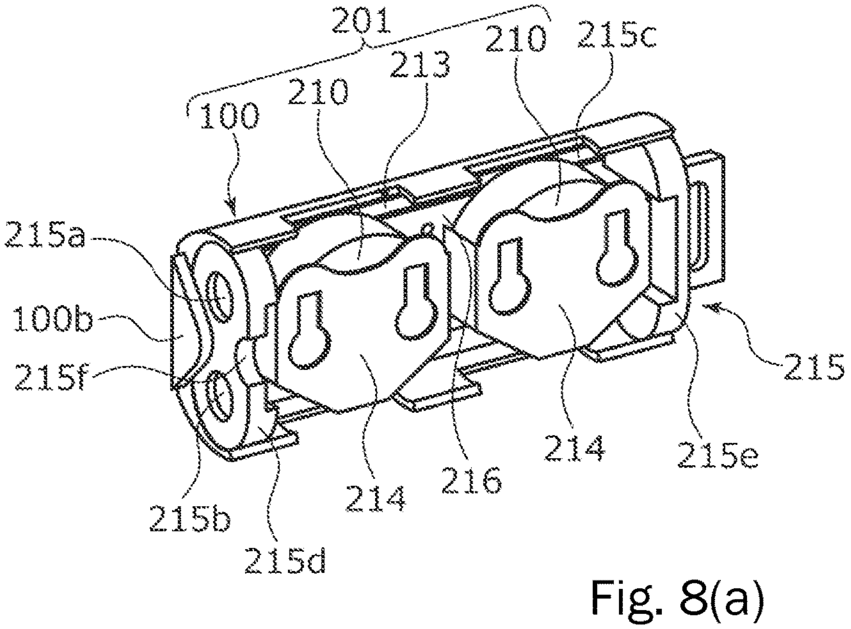
FIG. 8A is a perspective view illustrating the structure of a battery unit for an electronic device according to a second embodiment of the present invention.
Figure 8B:
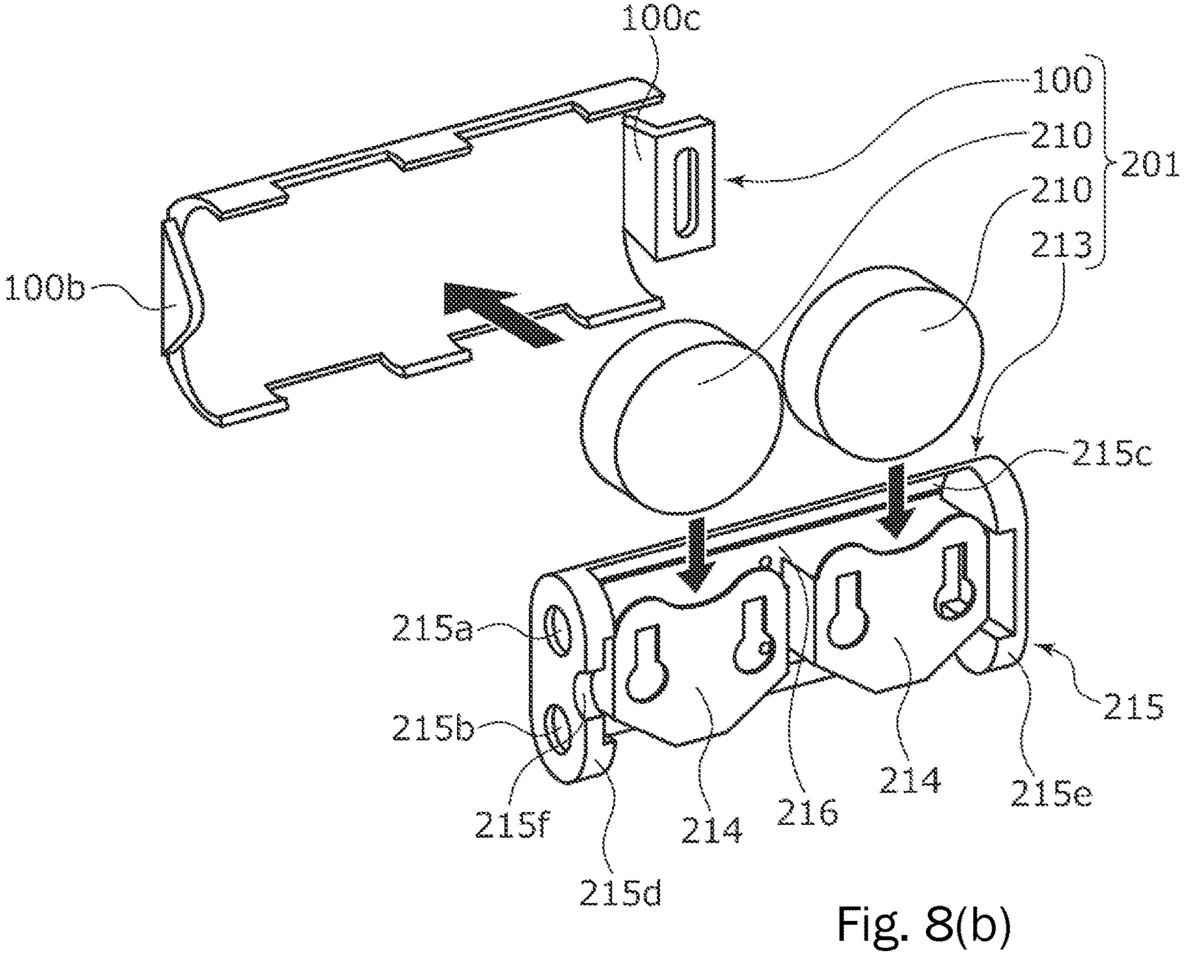
FIG. 8B is an exploded perspective view thereof.

As illustrated in FIG. 8, a battery unit 201 in the second embodiment includes the same battery holder 100 as in the first embodiment, two button cells 210, and a spacer 213. The spacer 213 can hold the button cells 210, and the spacer 213 holding the button cells 210 is detachable from the battery holder 100.

The spacer 213 includes respective retainers 214 capable of holding the two button cells 210, and a base member 215 provided with a positive terminal 215*a* and a negative terminal 215*b* which are electrically connected to the button cells 210 and are arranged side by side at one end in the longitudinal direction. The button cells 210 are attached to the retainers 214, so that the spacer 213 defines the positions of the button cells 210.

The base member 215 includes a base portion 215*c* having an inner surface to which a circuit board 216 is attached, and standing portions 215*d*, 215*e* standing on the inner surface side from the left and right end portions of the base portion 215*c*. The left standing portion 215*d* is provided with the positive terminal 215*a* and the negative terminal 215*b*. The circuit board 216 electrically connects the two retainers 214 with the positive terminal 215*a* and the negative terminal 215*b*.

That is, the longitudinal dimension of the base member 215 constituting the spacer 213 can be adjusted to the same battery holder 100 as in the first embodiment. Therefore, the spacer 213 holding the button cells 210 can be reliably held by the wall portions 100*b*, 100*c* of the battery holder 100 from the longitudinal direction.

Accordingly, the spacer 213 is used according to the shape of the button cells 210, so that the battery unit 201, specifically, the standing portion 215*d* of the base member 215 constituting the spacer 213 is in contact with and supported by the wall portion 100*b* of the battery holder 100. Accordingly, the longitudinal positions of the positive terminal 215*a* and the negative terminal 215*b* of the battery unit 201 can be arranged side by side at predetermined positions on the left side of the battery holder 100.

Further, since the wall portion 100*b* is located near the positive terminal 215*a* and the negative terminal 215*b*, the battery holder 100 is easily attached/detached at the time of battery replacement or the like, and at the time of attachment/detachment or the like, other components are unlikely to be brought into contact with the positive terminal 215*a* and the negative terminal 215*b*.

Additionally, the positive terminal 215*a* and the negative terminal 215*b* of the spacer 213 arranged side by side on one end side of the battery unit 201 in the longitudinal direction can be in contact with the positive terminal 42 and the negative terminal 43 of the pressure sensor 1, and the different shaped batteries can be used for the pressure sensor 1.

Further, since the two retainers 214 are arranged in the base member 215 so that the two button cells 210 can be arranged side by side on the base portion 215*c*, the thickness of the battery unit 201 can be made thin.

The battery unit 201 can also be used, for example, with one of the two button cells 210 held by the left retainer 214.

Further, as illustrated in FIG. 8, a recess 215*f* is formed in the standing portion 215*d* of the base member 215, in which the protrusion 122*h* (see FIG. 4) formed on the inner surface of the first plate portion 122*d* of the inner case 122 can be arranged. Accordingly, the direction in which the battery holder 100 is inserted/removed into/from the inner case 122 can be restricted to prevent the reverse connection of the button cells 210.

Third Embodiment

An electronic device according to a third embodiment of the present invention will be described with reference to FIG. 9. The redundant descriptions of the same configuration as in the first and second embodiments will be omitted.

Figure 9A:
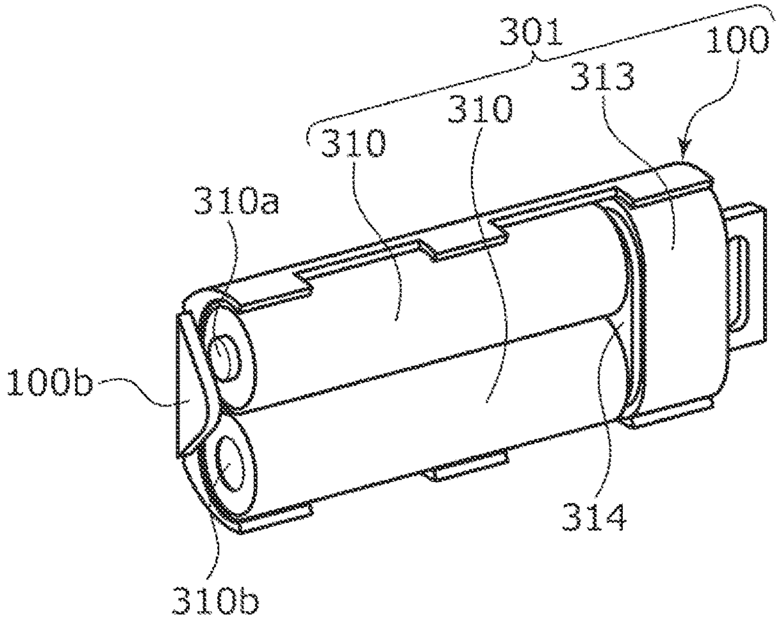
FIG. 9A is a perspective view illustrating the structure of a battery unit for an electronic device according to a third embodiment of the present invention.
Figure 9B:
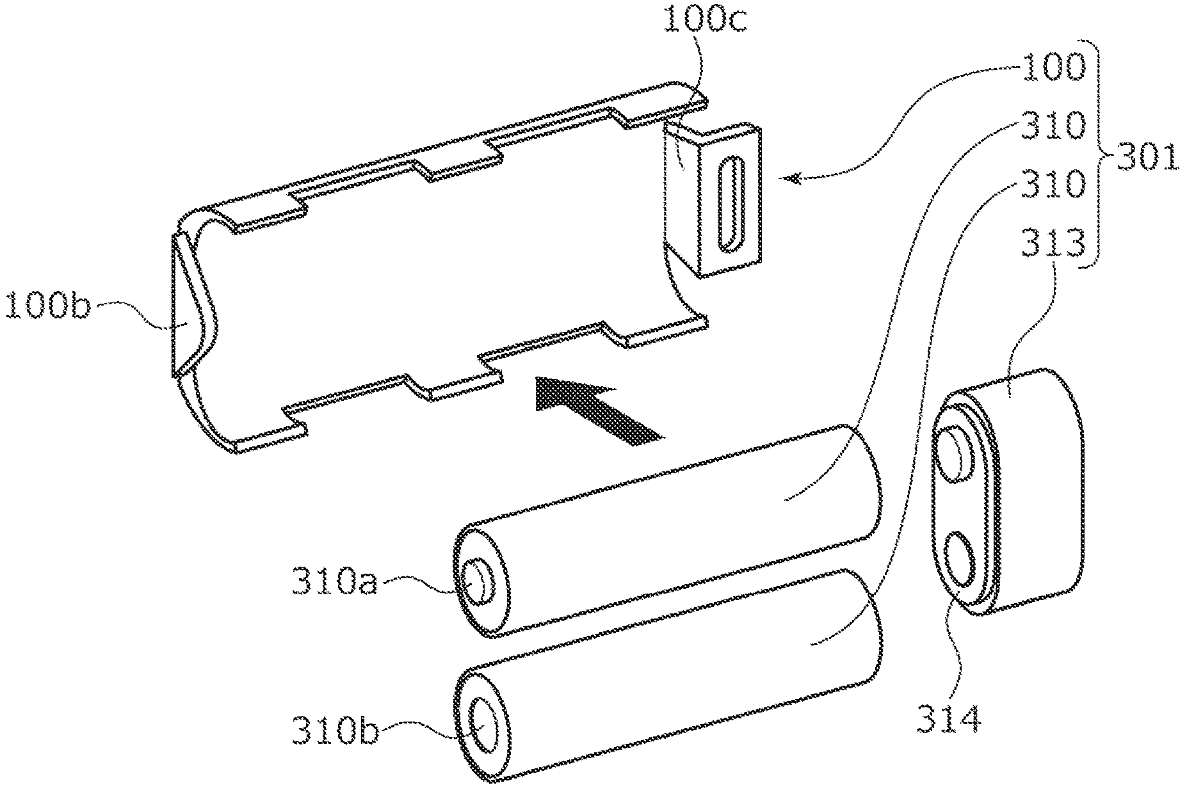
FIG. 9B is an exploded perspective view thereof.

As illustrated in FIG. 9, a battery unit 301 in the third embodiment includes the same battery holder 100 as in the first and second embodiments, two AA batteries 310, and a spacer 313. The spacer 313 is provided with a series connection terminal 314 on the left side in contact with the AA battery 310. The spacer 313 and the series connection terminal 314 may be provided separately.

Accordingly, the spacer 313 is used according to the shape of the AA battery 310, so that the battery unit 301 is in contact with and supported by the wall portion 100*b* of the battery holder 100. Accordingly, the longitudinal positions of the positive terminal and the negative terminal of the battery unit 301, that is, the positive electrode 310*a* and the negative electrode 310*b* of the two AA batteries 310 can be arranged side by side at predetermined positions on the left side of the battery holder 100.

Accordingly, since the wall portion 100*b* is located near the positive electrode 310*a* and the negative electrode 310*b*, the battery holder 100 is easily attached/detached at the time of battery replacement or the like, and at the time of attachment/detachment or the like, other components are unlikely to be brought into contact with the positive electrode 310*a* and the negative electrode 310*b*. Additionally, the positive electrode 310*a* and the negative electrode 310*b* of the two AA batteries 310 arranged side by side on one end side of the battery unit 301 in the longitudinal direction can be in contact with the positive terminal 42 and the negative terminal 43 of the pressure sensor 1, and the different shaped batteries can be used for the pressure sensor 1.

Fourth Embodiment

An electronic device according to a fourth embodiment of the present invention will be described with reference to FIG. 10. The redundant descriptions of the same configuration as in the first embodiment will be omitted.

Figure 10:
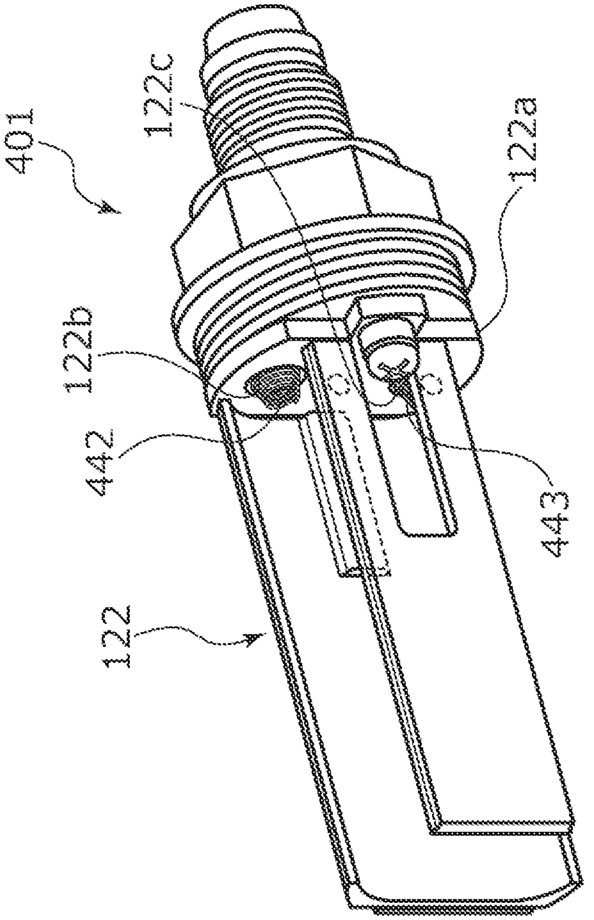
FIG. 10 is a perspective view illustrating the structure of a positive terminal and a negative terminal of a pressure sensor as an electronic device according to a fourth embodiment of the present invention.

As illustrated in FIG. 10, the positive terminal 442 and the negative terminal 443 of the pressure sensor 401 in the fourth embodiment are configured as spring terminals with conical helical compression springs.

Further, the positive terminal 442 and the negative terminal 443 are arranged side by side on the right surface of the circuit board 41 (see FIG. 3) and extend through the through holes 122*b*, 122*c* formed in the base portion 122*a* of the inner case 122. That is, the positive terminal 442 and the negative terminal 443 are supported to be contractible with the electric contacts projecting from the through holes 122*b*, 122*c*, respectively.

Accordingly, since the spring terminals with conical helical compression springs are used as the positive terminal 442 and the negative terminal 443 of the pressure sensor 401 according to the fourth embodiment, the positive terminal 442 and the negative terminal 443 can have a simplified configuration compared with the positive terminal 42 and the negative terminal 43 configured as probe pins according to the first embodiment.

Fifth Embodiment

An electronic device according to a fifth embodiment of the present invention will be described with reference to FIG. 11. The redundant descriptions of the same configuration as in the first embodiment will be omitted.

Figure 11:
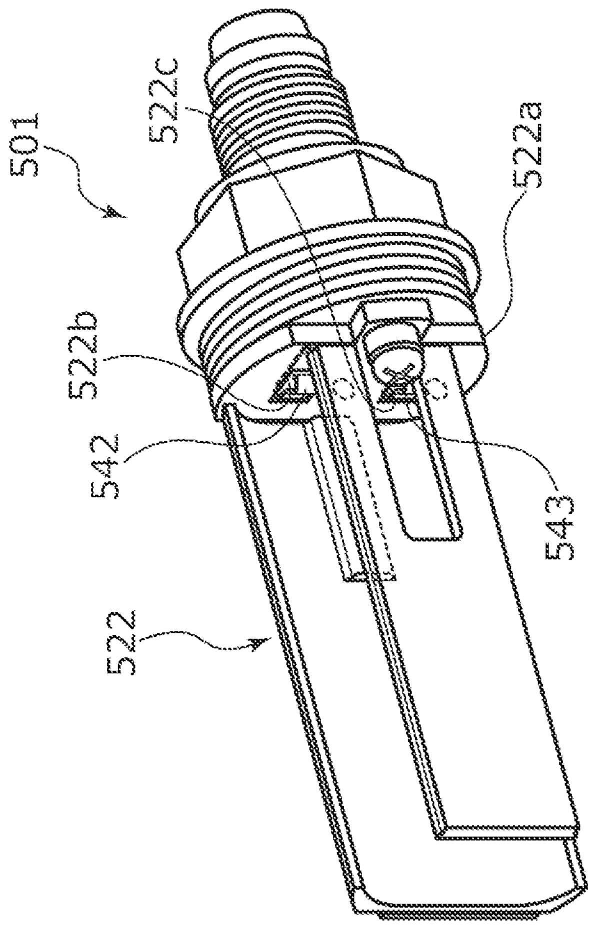
FIG. 11 is a perspective view illustrating the structure of a positive terminal and a negative terminal of a pressure sensor as an electronic device according to a fifth embodiment of the present invention.

As illustrated in FIG. 11, a positive terminal 542 and a negative terminal 543 of a pressure sensor 501 in the fifth embodiment are configured as spring terminals with thin leaf springs.

Further, the positive terminal 542 and the negative terminal 543 are arranged side by side on the surface of the circuit board 41, and extend through substantially rectangular through holes 522*b*, 522*c* formed in a base portion 522*a* of an inner case 522. That is, the positive terminal 542 and the negative terminal 543 are supported to be contractible with the electric contacts projecting from the through holes 522*b*, 522*c*, respectively.

Accordingly, since the spring terminals with thin leaf springs are used as the positive terminal 542 and the negative terminal 543 of the pressure sensor 501 according to the fifth embodiment, the positive terminal 542 and the negative terminal 543 can have a simplified configuration compared with the positive terminal 42 and the negative terminal 43 configured as probe pins according to the first embodiment.

Sixth Embodiment

An electronic device according to a sixth embodiment of the present invention will be described with reference to FIG. 12. The redundant descriptions of the same configuration as in the first embodiment will be omitted. Further, although not illustrated for convenience of explanation, the positive terminal and the negative terminal of the pressure sensor in the sixth embodiment will be described as being configured as terminals that do not expand and retract.

Figure 12:
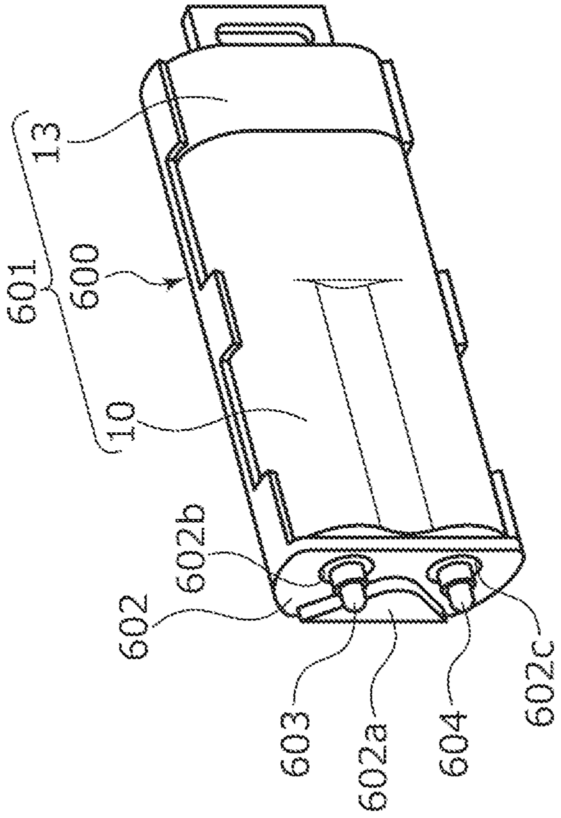
FIG. 12 is a perspective view illustrating the structure of a battery unit for an electronic device according to a sixth embodiment of the present invention.

As illustrated in FIG. 12, in the sixth embodiment, a battery holder 600 holds the battery 10 and the spacer 13 to constitute a battery unit 601.

A wall portion 602 at the left end portion of the battery holder 600 is formed into a substantially elliptical shape. Further, a substantially triangular protrusion 602*a* is formed on the left surface of the wall portion 602 to project to the left. Further, the wall portion 602 has through holes 602*b*, 602*c* formed side by side as cutouts extending therethrough in the left-right direction at a position avoiding the protrusion 602*a*.

Further, a positive terminal 603 and a negative terminal 604 of the battery unit 601 are arranged on the left surface of the wall portion 602. Further, the right surface of the wall portion 602 is in contact with one end of the battery 10 in the longitudinal direction with the battery 10 and the spacer 13 held by the battery holder 600. Accordingly, the positive electrode 10*a* and the negative electrode 10*b* of the battery 10 is in in contact with the positive terminal 603 and the negative terminal 604.

The positive terminal 603 and the negative terminal 604 are so-called probe pins, and each include urging means (not illustrated), and the electric contacts of the positive terminal 603 and the negative terminal 604 are contractible in an axial direction and are urged in the extending direction. Specifically, the positive terminal 603 and the negative terminal 604 extend through the through holes 602*b*, 602*c* extending through the wall portion 602 of the battery holder 600 in the thickness direction and formed side by side, and are supported to be elastically retractable to the right with respective electrical contacts projected from the through holes 602*b*, 602*c*.

Accordingly, the protrusion 602*a* of the upright wall portion 602 on one end side of the battery holder 600 in the longitudinal direction according to the seventh embodiment is in contact with the housing of the pressure sensor, so that the positive terminal 603 and the negative terminal 604 of the battery unit 601 can be elastically pressed against the positive terminal and the negative terminal of the pressure sensor to supply the power reliably.

Seventh Embodiment

An electronic device according to a seventh embodiment of the present invention will be described with reference to FIG. 13. The redundant descriptions of the same configuration as in the sixth embodiment will be omitted.

Figure 13:
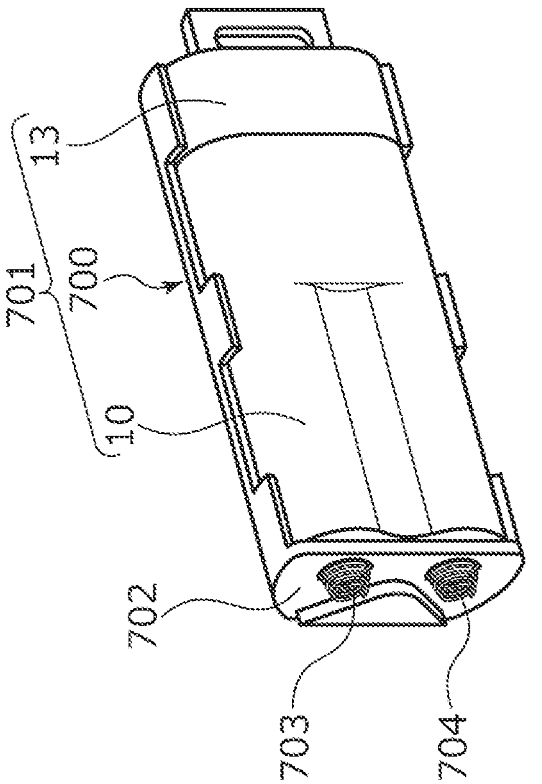
FIG. 13 is a perspective view illustrating the structure of a battery unit for an electronic device according to a seventh embodiment of the present invention.

As illustrated in FIG. 13, in the seventh embodiment, a battery holder 700 holds the battery 10 and the spacer 13 to constitute a battery unit 701.

A positive terminal 703 and a negative terminal 704 of the battery unit 701 are arranged on the left surface of a wall portion 702 of the battery holder 700.

The positive terminal 703 and the negative terminal 704 are configured as so-called spring terminals with conical helical compression springs.

Accordingly, the positive terminal 703 and the negative terminal 704 of the battery unit 701 according to the seventh embodiment can have a simplified configuration compared with the positive terminal 603 and the negative terminal 604 configured as probe pins according to the sixth embodiment.

Eighth Embodiment

An electronic device according to an eighth embodiment of the present invention will be described with reference to FIG. 14. The redundant descriptions of the same configuration as in the sixth and seventh embodiments will be omitted.

Figure 14:
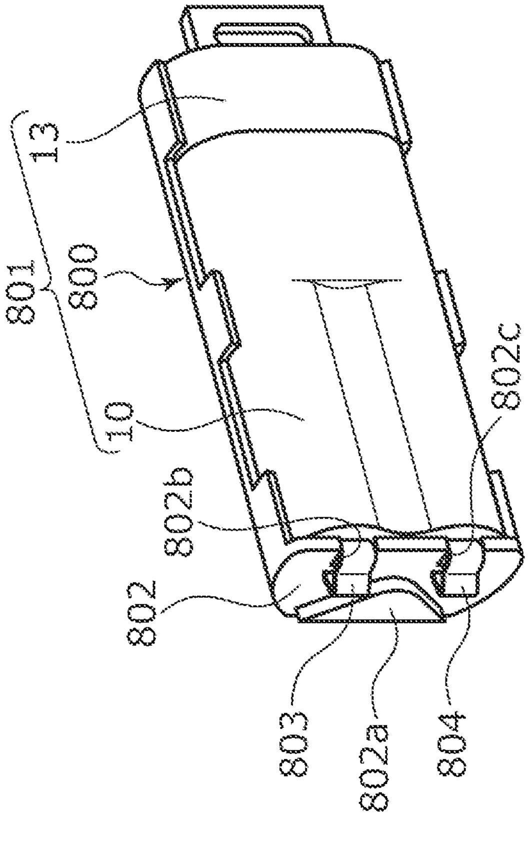
FIG. 14 is a perspective view illustrating the structure of a battery unit for an electronic device according to an eighth embodiment of the present invention.

As illustrated in FIG. 14, in the eighth embodiment, a battery holder 800 holds the battery 10 and the spacer 13 to constitute a battery unit 801.

A wall portion 802 at the left end portion of the battery holder 800 is formed into a substantially elliptical shape standing upright from the end portion of the battery holder 800 toward the inner surface side. Further, a substantially triangular protrusion 802*a* is formed on the left surface of the wall portion 802. Further, the wall portion 802 has cutouts 802*b*, 802*c* formed side by side at positions avoiding the protrusion 802*a*.

A positive terminal 803 and a negative terminal 804 are configured as so-called spring terminals with thin leaf springs. Specifically, the positive terminal 803 and the negative terminal 804 extend through the cutouts 802*b*, 802*c* formed side by side in the wall portion 802 of the battery holder 800, and are supported to be elastically retractable to the right with the respective electric contacts projected from the cutouts 802*b*, 802*c*. Further, instead of providing the cutouts 802*b*, 802*c*, the U-shaped positive terminal 803 and the negative terminal 804 may be arranged to hold the wall portion 802.

Accordingly, the positive terminal 803 and the negative terminal 804 of the battery unit 801 according to the eighth embodiment can have a simplified configuration compared with the positive terminal 603 and the negative terminal 604 configured as probe pins according to the sixth embodiment.

Ninth Embodiment

An electronic device according to a ninth embodiment of the present invention will be described with reference to FIG. 15. The redundant descriptions of the same configuration as in the first embodiment will be omitted.

Figure 15:
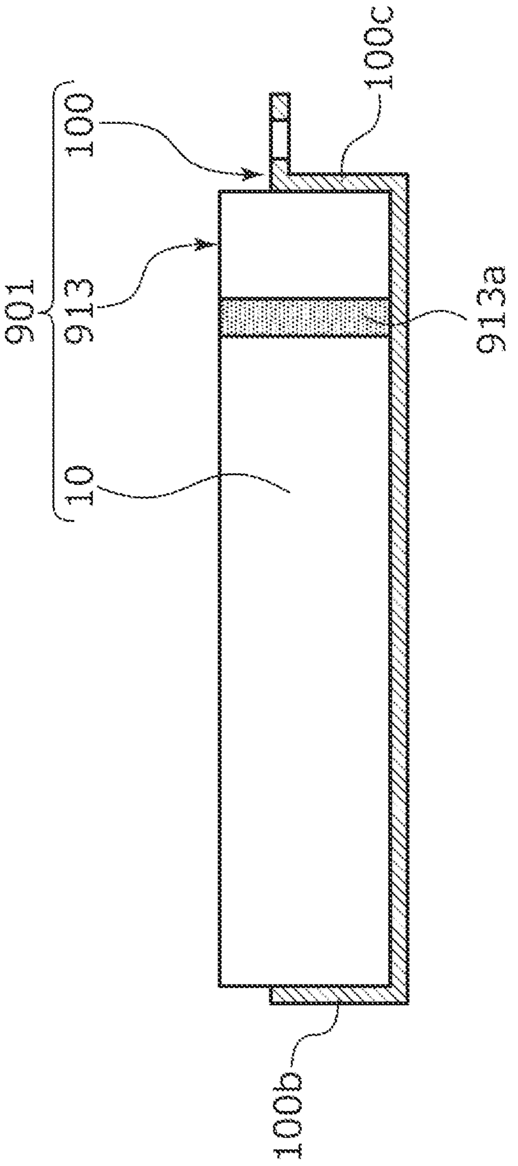
FIG. 15 is a cross-sectional view illustrating the structure of a battery unit for an electronic device according to a ninth embodiment of the present invention.

As illustrated in FIG. 15, in the ninth embodiment, a spacer 913 constituting a battery unit 901 has a left surface in contact with the right end portion of the battery 10, to which an elastically deformable rubber sheet 913*a* is attached. The material of the sheet is not limited to rubber as long as it is elastically deformable.

Accordingly, in the ninth embodiment, the rubber sheet 913*a* of the spacer 913 in contact with the right end portion of the battery 10 elastically deforms with the battery 10 and the spacer 913 held between the wall portions 100*b*, 100*c* of the battery holder 100. Therefore, regardless of the dimensional error between the battery holder 100 and the battery 10 and the spacer 913, the battery 10 and the spacer 913 can be reliably held by the battery holder 100 to prevent looseness of the battery 10 and the spacer 913.

The rubber sheet 913*a* may be provided only on the right surface of the spacer 913, or may be provided on both the left and right surfaces of the spacer 913. Further, the spacer 913 and the rubber sheet 913*a* may be provided separately.

Tenth Embodiment

An electronic device according to a tenth embodiment of the present invention will be described with reference to FIG. 16. The redundant descriptions of the same configuration as in the first embodiment will be omitted.

Figure 16:
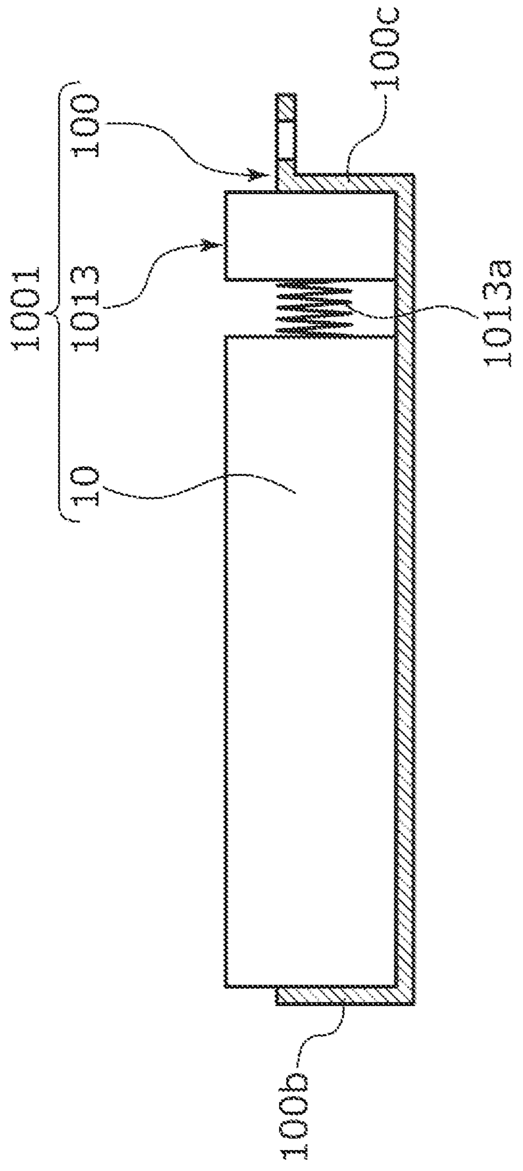
FIG. 16 is a cross-sectional view illustrating the structure of a battery unit for an electronic device according to a tenth embodiment of the present invention.

As illustrated in FIG. 16, in the tenth embodiment, a spacer 1013 constituting a battery unit 1001 has a left surface facing the right end portion of the battery 10, to which the right end of a helical compression spring 1013*a* is fixed.

Accordingly, in the tenth embodiment, the helical compression spring 1013*a* of the spacer 1013 can be elastically pressed against the right end portion of the battery 10 with the battery 10 and the spacer 1013 held between the wall portions 100*b*, 100*c* of the battery holder 100. That is, the left end portion of the battery 10 and the right surface of the spacer 1013 is pressed against the wall portions 100*b*, 100*c* of the battery holder 100, respectively, by the basing force of the helical compression spring 1013*a*. Therefore, regardless of the dimensional error between the battery holder 100 and the battery 10 and the spacer 1013, the battery 10 and the spacer 1013 can be reliably held by the battery holder 100 to prevent the looseness of the battery 10 and the spacer 1013.

The helical compression spring 1013*a* may be provided only on the right surface of the spacer 1013, or may be provided on both the left and right surfaces of the spacer 1013. Further, the spacer 1013 and the helical compression spring 1013*a* may be provided separately.

Eleventh Embodiment

An electronic device according to an eleventh embodiment of the present invention will be described with reference to FIG. 17. The redundant descriptions of the same configuration as in the first embodiment will be omitted.

Figure 17:
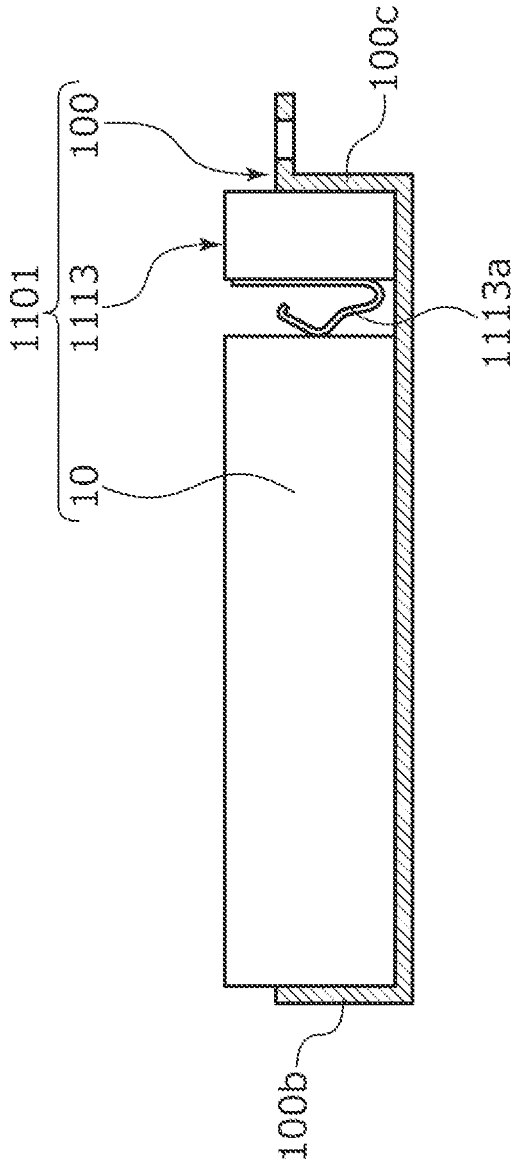
FIG. 17 is a cross-sectional view illustrating the structure of a battery unit for an electronic device according to an eleventh embodiment of the present invention.

As illustrated in FIG. 17, in the eleventh embodiment, a spacer 1113 constituting a battery unit 1101 has a left surface facing the right end portion of the battery 10, to which a thin leaf spring 1113*a* is fixed.

Accordingly, in the eleventh embodiment, the thin leaf spring 1113*a* of the spacer 1113 can be elastically pressed against the right end portion of the battery 10 with the battery 10 and the spacer 1113 held between the wall portions 100*b*, 100*c* of the battery holder 100. That is, the left end portion of the battery 10 and the right surface of the spacer 1113 is pressed against the wall portions 100*b*, 100*c* of the battery holder 100, respectively, by the urging force of the thin leaf spring 1113*a*. Therefore, regardless of the dimensional error between the battery holder 100 and the battery 10 and the spacer 1113, the battery 10 and the spacer 1113 can be reliably held by the battery holder 100 to prevent the looseness of the battery 10 and the spacer 1113.

The thin leaf spring 1113*a* may be provided only on the right surface of the spacer 1113, or may be provided on both the left and right surfaces of the spacer 1113. Further, the spacer 1113 and the thin leaf spring 1113*a* may be provided separately.

Twelfth Embodiment

An electronic device according to a twelfth embodiment of the present invention will be described with reference to FIG. 18. The redundant descriptions of the same configuration as in the first embodiment will be omitted.

Figure 18:
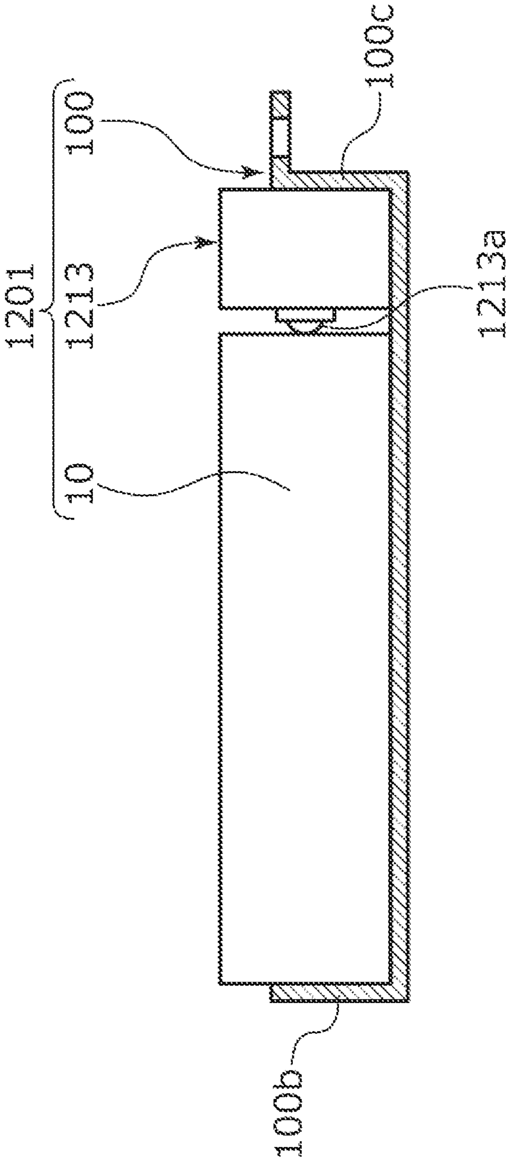
FIG. 18 is a cross-sectional view illustrating the structure of a battery unit for an electronic device according to a twelfth embodiment of the present invention.

As illustrated in FIG. 18, in the twelfth embodiment, a spacer 1213 constituting a battery unit 1201 has a left surface facing the right end portion of the battery 10, on which the tip of a plunger 1213*a* having an elastically urging function is exposed. The plunger 1213*a* according to the twelfth embodiment includes a built-in spring (not illustrated), and the ball at the tip is urged to the left.

Accordingly, in the twelfth embodiment, the tip of the plunger 1213*a* of the spacer 1213 can be elastically pressed against the right end portion of the battery 10 with the battery 10 and the spacer 1213 held between the wall portions 100*b*, 100*c* of the battery holder 100. That is, the left end portion of the battery 10 and the right surface of the spacer 1213 is pressed against the wall portions 100*b*, 100*c* of the battery holder 100, respectively, by the urging force of the plunger 1213*a*. Therefore, regardless of the dimensional error between the battery holder 100 and the battery 10 and the spacer 1213, the battery 10 and the spacer 1213 can be reliably held by the battery holder 100 to prevent the looseness of the battery 10 and the spacer 1213.

The plunger 1213*a* may be provided only on the right surface of the spacer 1213, or may be provided on both the left and right surfaces of the spacer 1213. Further, the spacer 1213 and the plunger 1213*a* may be provided separately.

Thirteenth Embodiment

An electronic device according to a thirteenth embodiment of the present invention will be described with reference to FIG. 19. The redundant descriptions of the same configuration as in the third embodiment will be omitted.

Figure 19A:
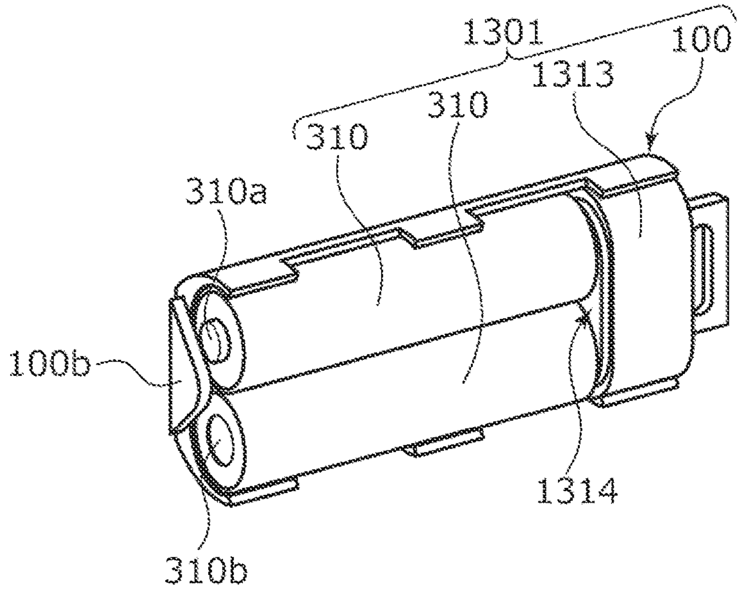
FIG. 19A is a perspective view illustrating the structure of a battery unit for an electronic device according to a thirteenth embodiment of the present invention.
Figure 19B:
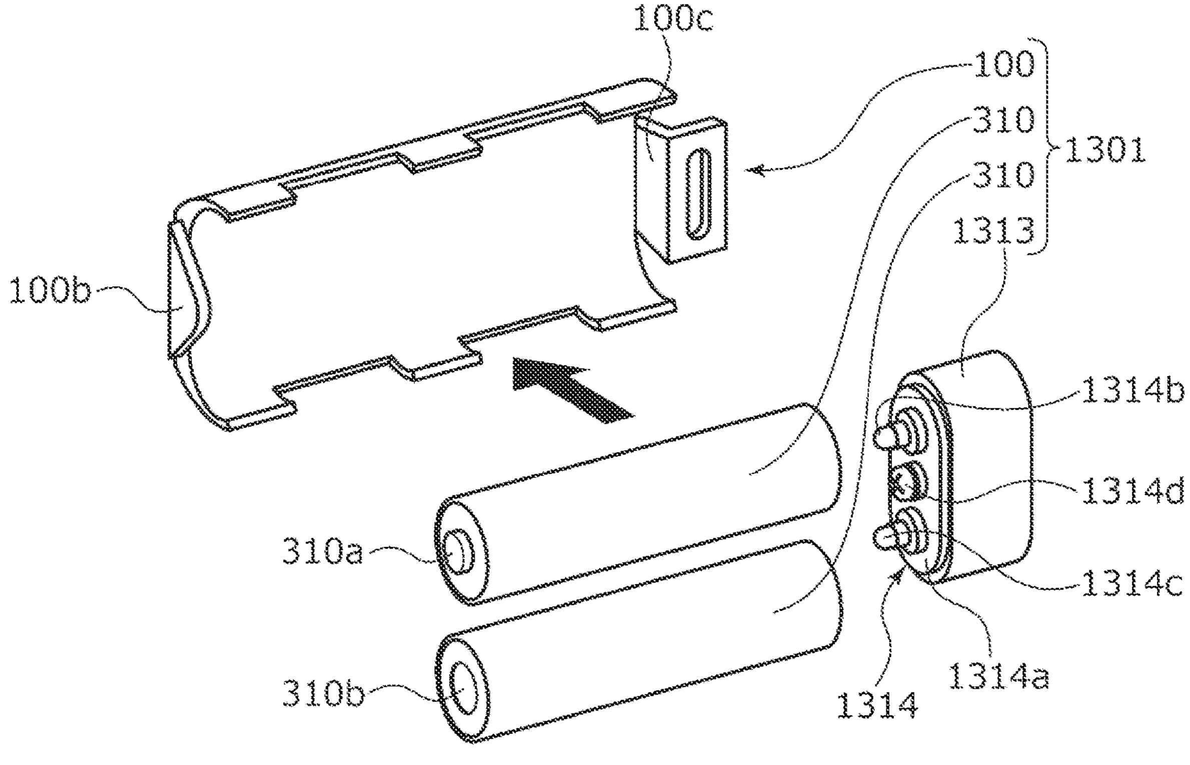
FIG. 19B is an exploded perspective view thereof.

As illustrated in FIG. 19, a battery unit 1301 according to the thirteenth embodiment includes the same battery holder 100 as in the first and second embodiments, two AA batteries 310, and a spacer 1313. The spacer 1313 is provided with a series connection terminal 1314 on the left side in contact with the AA battery 310.

The series connection terminal 1314 includes two terminals 1314*b*, 1314*c* arranged side by side on a series connection circuit board 1314*a*. The terminals 1314*b*, 1314*c* are so-called probe pins, and each include urging means (not illustrated), and the electric contacts of the terminals 1314*b*, 1314*c* are contractible in the axial direction and are urged in the extending direction. Further, the series connection circuit board 1314*a* is fixed to the left surface of the spacer 1313 by the fixing screw 1314*d*. The spacer 1313 and the series connection terminal 1314 may be provided separately.

Accordingly, in the thirteenth embodiment, the electrical contacts of the terminals 1314*b*, 1314*c* of the series connection terminal 1314 in the spacer 1313 can be elastically pressed against the right end portions of the two AA batteries 310 with the two AA batteries 310 and the spacer 1313 held between the wall portions 100*b*, 100*c* of the battery holder 100. That is, the left end portions of the two AA batteries 310 and the right surface of the spacer 1313 is pressed against the wall portions 100*b*, 100*c* of the battery holder 100, respectively, by the urging force of the terminals 1314*b*, 1314*c*. Therefore, regardless of the dimensional error between the battery holder 100 and the battery 10 and the spacer 1313, the battery 10 and the spacer 1313 can be reliably held by the battery holder 100 to prevent the looseness of the battery 10 and the spacer 1313. Further, different shaped batteries can be used for the pressure sensor 1.

The terminals 1314*b*, 1314*c* of the series connection terminal 1314 in the spacer 1313 are not limited to the probe pins, and may be configured as, for example, spring terminals with helical compression springs or thin leaf springs as long as they have an urging force.

Although the embodiments of the present invention have been described above with reference to the drawings, the specific configuration is not limited to these embodiments, and any changes or additions made without departing from the scope of the present invention are included in the present invention.

For example, the electronic device according to the present invention is not limited to the pressure sensor, and may be applied to other sensors or electronic devices other than the sensor as long as it includes a battery as the power source.

Further, the battery unit may be configured such that a battery other than the pack lithium battery, the button cell, and the AA battery described above, for example, a AAA battery, a square battery, and a coin battery, and a spacer corresponding to the shape of these batteries are held by the battery holder.

Further, a control chip and a wireless chip which constitute the circuit unit may be provided at any position on the circuit board.

Further, in the embodiments described above, a mode in which either the positive terminal and the negative terminal of the pressure sensor or the positive terminal and the negative terminal of the battery unit are configured to be contractible has been described, but the present invention is not limited to this. Both the positive terminal and the negative terminal of the pressure sensor and the positive terminal and the negative terminal of the battery unit may be configured to be contractible.

Further, the configuration of the probe pin and the spring terminal may be applied to the positive terminal 215*a* and the negative terminal 215*b* of the base member 215 constituting the spacer 213 according to the second embodiment to protrude the electrical contacts of the positive terminal and the negative terminal from the cutouts provided in the wall portion 100*b* of the battery holder 100, respectively.

Further, the battery holders 600, 700, 800 according to the six to eight embodiments may be applied to, for example, the configurations of the battery units with the batteries other than the pack lithium battery according to the second and third embodiments.

Further, the configurations of the spacers 913, 1013, 1113, 1213 according to the ninth to twelfth embodiments may be applied to the configurations of the battery units according to the first to eighth embodiments.

REFERENCE SIGNS LIST

1 pressure sensor (electronic device)
10 pack lithium battery (battery)
10*a* positive electrode (positive terminal of battery unit)
10*b* negative electrode (negative terminal of battery unit)
13 spacer
20 housing
21 mounting member
22 cover member
23 cap member
30 sensor unit
40 circuit unit
41 circuit board
42 positive terminal (positive terminal of electronic device)
43 negative terminal (negative terminal of electronic device)
44 processing chip
45 circuit board
46 wireless chip
100 battery holder
100*b*, 100*c* wall portion
100*d* handle
100*e* claw
100*g* recessed groove
100*h* recess
100*k*, 100*m* cutout space
101 battery unit
121 outer case
122 inner case
122*b*, 122*c* through hole
122*d* first plate portion
122*e* second plate portion
122*m* protruded portion
122*n* protrusion
201 battery unit
210 button cell
213 spacer
214 retainer
215 base member
215*a* positive terminal (positive terminal of battery unit)
215*b* negative terminal (negative terminal of battery unit)
215*d*, 215*e* standing portion
301 battery unit
310 AA battery
310*a* positive electrode (positive terminal of battery unit)
310*b* negative electrode (negative terminal of battery unit)
313 spacer
314 series connection terminal
G guide portion
P positioning mechanism

The invention claimed is:

1. A battery unit housed in an electronic device in use, comprising:

a positive terminal and a negative terminal arranged side by side on one end side of the battery unit in use;

a battery holder configured for holding one of a first battery and a second battery in use, the first battery and the second battery having different shapes;

a spacer configured for defining a position of the first battery or the second battery, wherein the spacer is constituted in use by a first spacer designed for the first battery or a second spacer designed for the second battery, the second spacer holds the second battery in use and has a positive terminal and a negative terminal which are electrically connected to a positive terminal and a negative terminal of the second battery in use, the battery holder has an upright wall portion formed at one end of the battery holder and configured to come into contact with and support the first battery or the second spacer so as to expose the positive terminal and the negative terminal of the battery unit, the positive terminal and the negative terminal of the battery unit is the positive terminal and the negative terminal of the first battery when the first battery and the first spacer are held by the battery holder, and the positive terminal and the negative terminal of the battery unit is the positive terminal and the negative terminal of the second spacer when the second battery and the second spacer is held by the battery holder.

2. The battery unit according to claim 1, wherein the wall portion is located between the positive terminal and the negative terminal of the battery unit.

3. The battery unit according to claim 1, wherein the battery holder includes claws configured to hold the first battery and the first spacer or configured to hold the second spacer with the second battery held the second spacer in use.

4. The battery unit according to claim 1, wherein the first battery is selected from the group consisting of a pack lithium battery, a AA battery, a AAA battery, a square battery, and a coin battery.

5. The battery unit according to claim 1, wherein the second battery is a button cell, the second spacer includes a base member, and the base member is provided with retainers configured for holding the button cell, and the positive terminal and the negative terminal of the battery unit that are electrically connected to the button cell.

6. An electronic device comprising the battery unit according to claim 1 and a housing having the battery unit housed therein, wherein the electronic device further comprises a positive terminal and a negative terminal arranged side by side, and at least one pair of the positive terminal and the negative terminal of the electronic device and the positive terminal and the negative terminal of the battery unit is formed to be contractible.

* * * * *